United States Patent
Vorba

(10) Patent No.: US 11,798,220 B2
(45) Date of Patent: Oct. 24, 2023

(54) PATH GUIDING FOR PATH-TRACED RENDERING

(71) Applicant: Unity Technologies SF, San Francisco, CA (US)

(72) Inventor: Jiří Vorba, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/362,555

(22) Filed: Jun. 29, 2021

(65) Prior Publication Data
US 2022/0036641 A1 Feb. 3, 2022

Related U.S. Application Data

(60) Provisional application No. 63/057,808, filed on Jul. 28, 2020.

(51) Int. Cl.
*G06T 15/06* (2011.01)
*G06T 15/50* (2011.01)

(52) U.S. Cl.
CPC ............ *G06T 15/06* (2013.01); *G06T 15/506* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 9,619,924 B2 | 4/2017 | Spencer et al. | |
| 10,614,613 B2* | 4/2020 | Fricke | G06T 15/506 |
| 10,991,147 B1 | 4/2021 | Bakalash et al. | |
| 2018/0018814 A1* | 1/2018 | Dahm | G06T 15/506 |
| 2018/0089894 A1* | 3/2018 | Sun | G06T 7/80 |
| 2018/0130252 A1 | 5/2018 | Seibert et al. | |
| 2019/0139295 A1 | 5/2019 | Novak et al. | |
| 2019/0318530 A1 | 10/2019 | Hunt et al. | |
| 2020/0035016 A1* | 1/2020 | Muller | G06N 3/08 |
| 2020/0312009 A1 | 10/2020 | Sun et al. | |

OTHER PUBLICATIONS

Vorba, Jiří, and Jaroslav Křivánek. "Adjoint-driven russian roulette and splitting in light transport simulation." ACM Transactions on Graphics (TOG) 35.4 (2016): 1-11. (Year: 2016).*
Reibold et al., "Selective guided sampling with complete light transport paths," Acm Transactions on Graphics 37(6): 223, pp. 1-14, [doi=10.1145/3272127.3275030] (2018) Article.

(Continued)

*Primary Examiner* — Ryan McCulley
(74) *Attorney, Agent, or Firm* — Haynes and Boone, LLP

(57) ABSTRACT

A computer-implemented method for generating a mask for a light source in a virtual scene includes determining a bounding box for the scene based on a frustum of a virtual camera and generating a path-traced image of the scene within the bounding box. Light paths emitted by the camera and exiting at the light source are stored, and objects poorly sampled by the light source are removed from the scene. An initial mask for the light source is generated from the density of light paths exiting at that position on the light source. The initial mask is refined by averaging in the light path density at each point on the light source for subsequent images.

12 Claims, 18 Drawing Sheets

(56) References Cited

OTHER PUBLICATIONS

Novák et al., "Monte Carlo Methods for Volumetric Light Transport Simulation," Computer Graphics Forum: Journal of European Association for Computer Graphics 37(2):551-576 [doi=10.1111/cgf.13383] (2018).
Vorba et al., "Path Guiding in Production," ACM SIGGRAPH 2019 18:1-77 [doi=10.1145/3305366.3328091] (2019).
International Search Report for PCT Application No. PCT/NZ2021/050115, dated Oct. 29, 2021.
Vorba, Jiří, et al. "On-line learning of parametric mixture models for light transport simulation." ACM Transactions on Graphics (TOG) 33.4 (2014): 1-11. (Year: 2014).

* cited by examiner

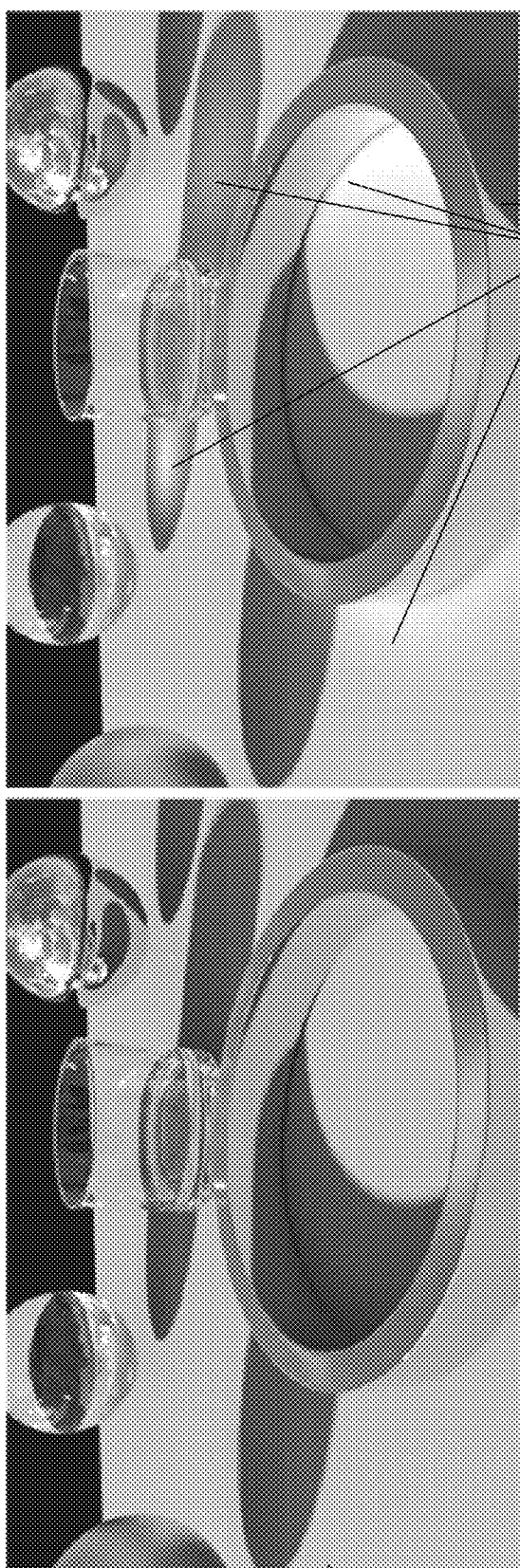
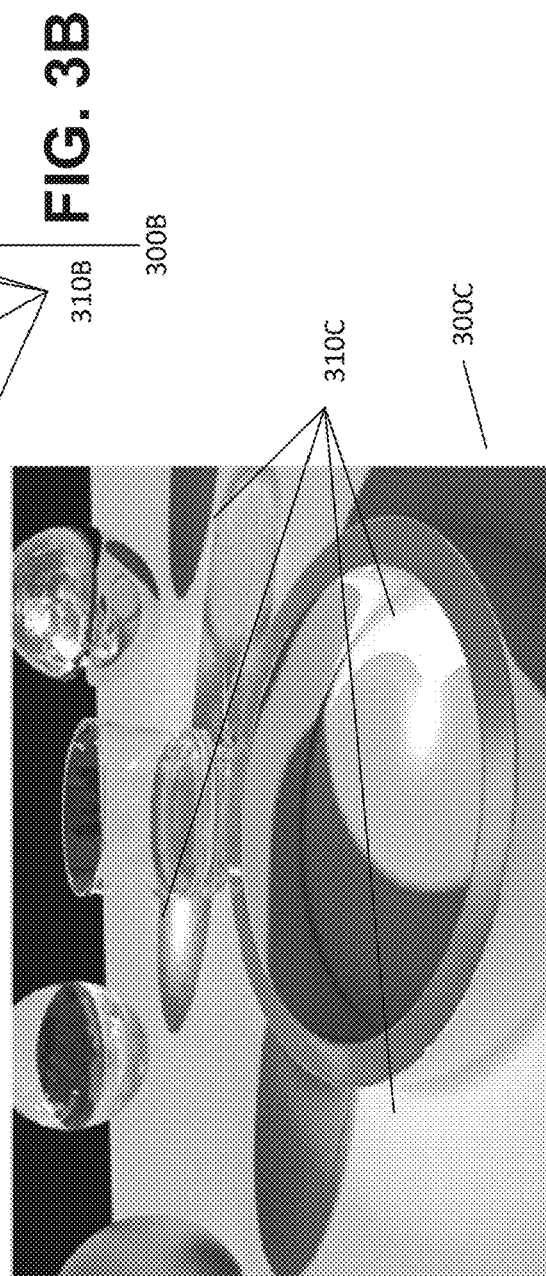
FIG. 3A
FIG. 3B
FIG. 3C

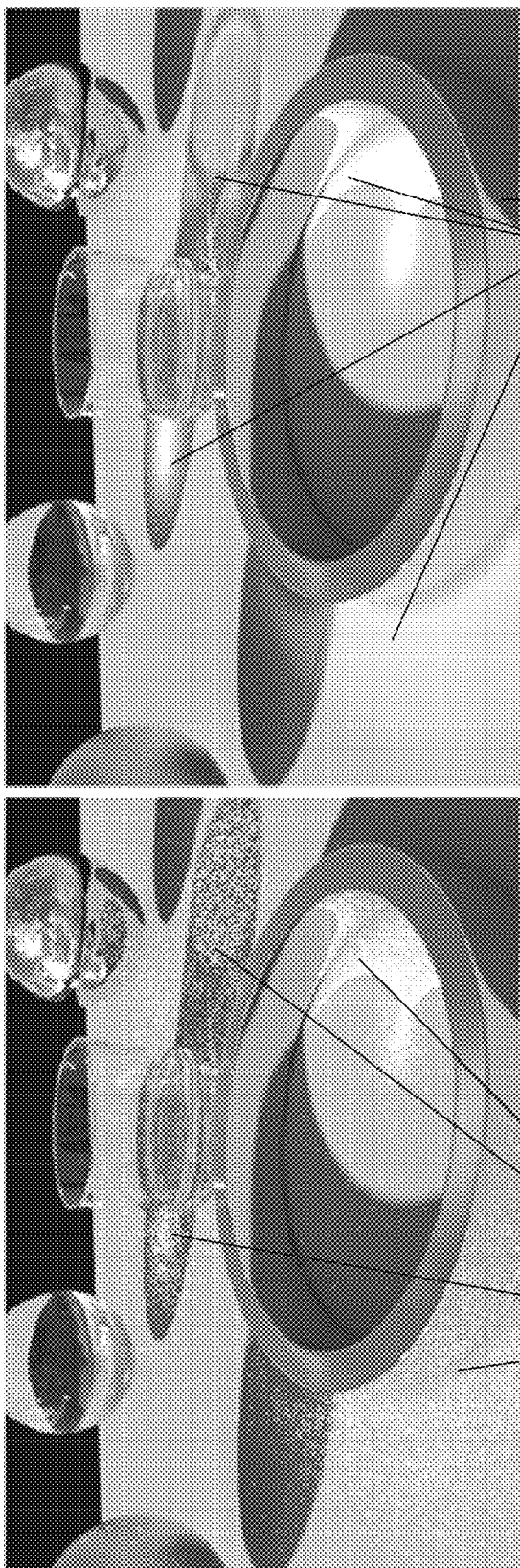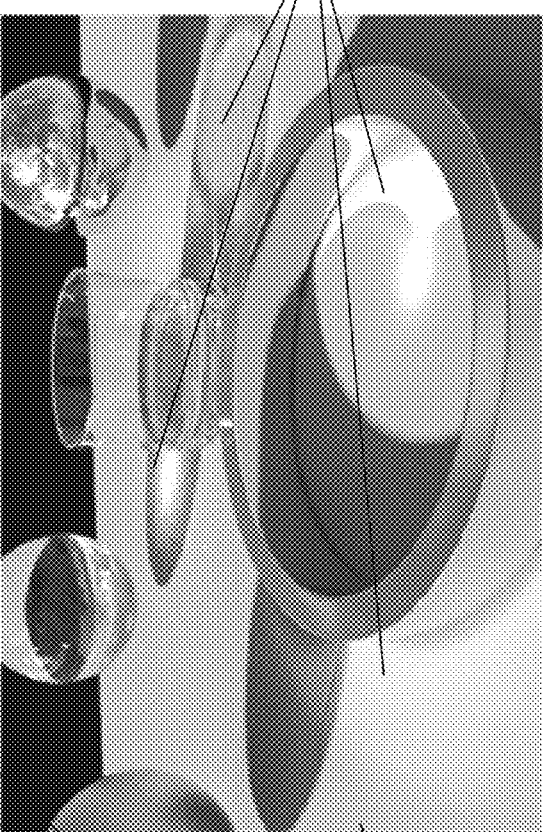
FIG. 4A
FIG. 4B
FIG. 4C

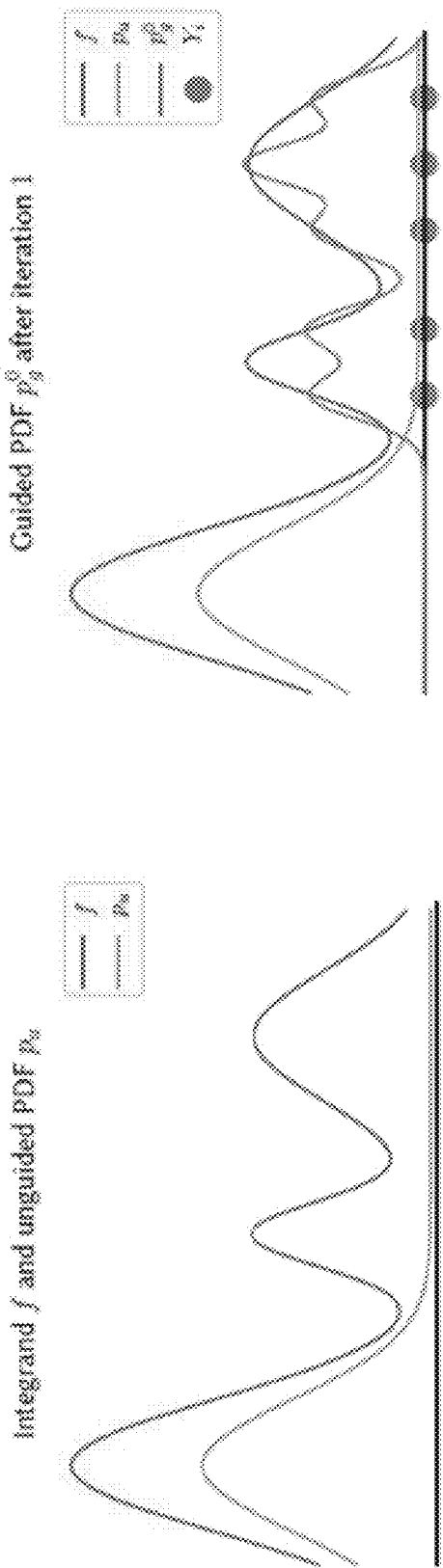
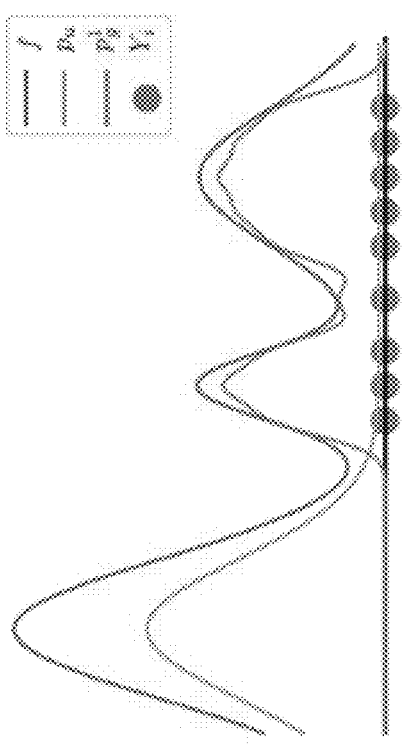
FIG. 7A
FIG. 7B
FIG. 7C

PATH GUIDING FOR PATH-TRACED RENDERING

CROSS-REFERENCES TO PRIORITY AND RELATED APPLICATIONS

This application claims the priority benefit of U.S. Provisional Patent Application No. 63/057,808 filed Jul. 28, 2020, hereby incorporated by reference in its entirety as though fully set forth herein.

FIELD

The present disclosure generally relates to rendering of computer-generated scene data, and more particularly to efficient computation of data structures for rendering that represent complex lighting situations.

BACKGROUND

Visual representations of scenes intended to reflect real-world scenarios are common in animation and other fields. As viewers have come to expect more complex visuals, there is a need for more sophisticated computer-driven imagery generation. Some of that computer-driven imagery generation might rely on simulation, for example, if the scene contains simulated objects.

Rendered images may be produced from a scene by ray tracing. From a camera location, an algorithm fires off "rays" through each pixel in the image grid. As a ray hits an object, the algorithm determines the illumination of that point on the object and combines the illumination with the color of the object that that point. The result is the color to use for that pixel. However, the algorithm needs to determine the illumination at that point on the object and more particularly, the parts of the illumination that head in the direction of the camera. To make this determination, the algorithm needs to fire off rays in all directions from that object to some source of light (either a light source or some other object that is reflecting light). Each time there is a bounce, that multiplies the number of rays needed. If the object in not perfectly shiny, the algorithm may need to send many rays out and average over them. This process is computationally intensive, because there might be many reflection bounces between the camera and the light source, each of which multiplies the number of rays used.

An alternative to ray tracing is path tracing; instead of (for example) sending one ray from the camera pixel to an object, 100 rays from that object to the next object, and 100 rays each from each of those objects (10,000 rays total), a path tracing algorithm may send out a plurality of rays from the camera through that one pixel, and have each one bounce off the first-encountered object in a random direction (e.g., fire 5,000 rays from a camera through the pixel to a point on the object). The algorithm can then bounce each of these in a random direction (while not sending out more than one ray for each incoming ray) and when a ray hits another object, bounce in a second random direction. Ignoring early termination, there may then be (for example) 5,000 rays bouncing around, each forming a unique path. However, many of those 5,000 paths are not informative, in that they do not provide significant contributions to the color or brightness of the pixel. Where one of those 5,000 paths for a pixel hits a light source exactly, that pixel is bright. However, the 5,000 rays for the next pixel over might miss all light sources, and/or the same pixel in subsequent frames may miss the light source. This creates noise. The noise can be reduced by adding more paths per pixel, but this is computationally intensive.

Path tracing is a common method for rendering scenes, wherein each path comprises a plurality of vertices, where each vertex represents the path encountering a surface or material. At each vertex, the path may reflect, refract, or scatter, each of which results in a change in direction for the new path segment. Path tracing can be used in production environments to render many types of scenes realistically.

However, realistic rendering of complex lighting situations can be computationally prohibitive. Complex lighting situations may include diffusive reflection, diffusive diffraction, indirect lighting, occlusion, and caustics. Even with large numbers of paths per pixel (and thus proportionally slow rendering times), such effects often cannot be rendered in a satisfactory manner. A need therefore exists for computational methods to render complex lighting situations more realistically, and with minimal computational overhead.

SUMMARY

A path guiding method as described herein can provide realistic rendering of complex lighting situations for use in computer graphics and animation, as described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for generating a mask for a light source used in rendering virtual scenes under control of one or more computer systems configured with executable instructions, perform steps of: determining a bounding volume (e.g., a bounding box) for a scene based on a frustum or spherical aperture of a virtual camera having a virtual camera position in the scene; generating a path-traced first image of a portion of the scene within the bounding box by projecting a plurality of first light paths from the virtual camera position, where each first light path of the plurality of first light paths includes a plurality of vertices; storing a light paths subset of the plurality of first light paths, where a stored light path in the light paths subset is a light path that exits at the light source; removing objects from the scene that are sampled less than a predetermined threshold by the first light paths to form a modified virtual scene; generating an initial mask for the light source from the light paths subset such that at least some positions on the light source is assigned an emission probability in the initial mask based on a density of first light paths exiting at that position on the light source, thereby generating a masked light source data structure; refining the initial mask, to form a refined mask, by generating successive second images of the scene by repeatedly: (a) generating a path-traced second image using the masked light source data structure and the modified virtual scene to generate a plurality of second light paths; (b) storing the second light paths that exit at the virtual camera position; and (c) modifying an emission probability of each position on the light source based on a cumulative average across a plurality of the successive second images of a density of second light paths emitted from that position that exit at the virtual camera. The computer-implemented method also includes storing the refined mask into computer memory for use in a rendering process. Other implementations include corresponding computer systems, apparatus, and computer programs recorded on one or more computer storage devices, each configured to perform the actions of the methods.

Implementations may include one or more of the following features. In some implementations, the frustum includes a truncated pyramid. In some implementations, the predetermined threshold is zero samples. In some implementations, the refined mask includes a probability density function. In some implementations, the computer-implemented method further includes: if a termination/splitting factor is less than one, terminating a light path. In some implementations, the refined mask includes nonzero emission probability only for positions capable of emitting into the bounding box. In some implementations, the cumulative average is cumulative across at least some of the successive second images. In some implementations, terminating a given light path includes deleting selected vertices of the given light path. Some implementations further include denoising the path-traced first image or a path-traced second image. In some implementations, the denoising includes employing density-based outlier rejection. In some implementations, light paths of the light paths subset are other than diffuse reflection light paths, diffuse refraction light paths, or caustics light paths. Some implementations include computer system for modeling surfaces of virtual or simulated objects, the computer system including: at least one processor; and a computer-readable medium storing instructions, which when executed by the at least one processor, causes the computer system to carry out the method. Some implementations include a non-transitory computer-readable storage medium storing instructions, which when executed by at least one processor of a computer system, causes the computer system to carry out the method. Implementations of the described techniques may include hardware, a method or process, or computer software on a computer-accessible medium.

One general aspect includes a computer-implemented method for generating a light guide path for use in rendering virtual scenes under control of one or more computer systems configured with executable instructions. The method includes performing steps of: placing within a scene a virtual camera having a virtual camera position, generating a mask for a light source of the scene such that each position on the light source is assigned an emission probability based on a density of light paths emitted by the virtual camera exiting at that position on the light source or of light paths emitted from that position on the light source and exiting at the virtual camera position, thereby generating a masked light source data structure; generating a path-traced image by using the masked light source data structure to generate a plurality of light paths and storing a light path subset including the light paths of the plurality of light paths that exit at the virtual camera; using quad trees to identify a light paths subset of the plurality of light paths that are sampled less than a pre-determined threshold; for at least some light path of the light paths subset: computing a distribution for at least one vertex of a first plurality of vertices of the light path; using the distributions, sampling a position for at least one other vertex of the first plurality of vertices; constructing a guided light path from the sampled positions of the at least one vertex of the first plurality of vertices; and modifying the guided light path by iteratively sampling the positions of the at least one vertex until the guided light path is visible to the virtual camera. The computer-implemented method also includes constructing a path-guided image using only the modified guided light paths; and combining the path-traced image with the path-guided image to form a scene image storable in computer memory. Other implementations include corresponding computer systems, apparatus, and computer programs recorded on one or more computer storage devices, each configured to perform the actions of the methods.

Implementations may include one or more of the following features. In some implementations, the distribution of each vertex of the second plurality of vertices includes a 2D Gaussian distribution. In some implementations, the distribution of each vertex of the second plurality of vertices includes an anisotropic reconstruction kernel. In some implementations, the method further includes: if a termination/splitting factor is greater than 1, splitting the guided light path into at least two guide paths. In some implementations, the splitting the guided light path includes resampling two vertices for each distribution. In some implementations, the method further includes: if a termination/splitting factor is less than 1, terminating the guided light path. In some implementations, terminating the guided light path includes deleting at least some vertices of the guided light path. In some implementations, the guided light paths include diffuse reflection, diffuse refraction, or caustics. In some implementations, the method further includes denoising at least one of the path traced image or the path guided image. In some implementations, the denoising includes density-based outlier rejection. In some implementations, iteratively sampling the positions of each vertex involves more than one iteration. In some implementations, iteratively resampling the positions of each vertex involves more than four iterations. In some implementations, iteratively resampling the positions of each vertex involves more than twenty iterations. Some implementations include a computer system for modeling surfaces of virtual or simulated objects, the system including: at least one processor; and a computer-readable medium storing instructions, which when executed by the at least one processor, causes the system to carry out the method. Some implementations include a non-transitory computer-readable storage medium storing instructions, which when executed by at least one processor of a computer system, causes the computer system to carry out the method. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the path guiding method, as defined in the claims, is provided in the following written description of various examples of the disclosure and illustrated in the accompanying drawings.

BRIEF DESCRIPTION OF THE DRAWINGS

Various examples in accordance with the present disclosure will be described with reference to the drawings, in which.

FIG. 3A illustrates a scene that includes specular reflections, diffuse reflections, shadows, and refraction through transparent materials, without properly rendered caustics.

FIG. 3B illustrates a scene that includes the same objects and light sources as FIG. 3A, but also includes weak caustics.

FIG. 3C illustrates a scene that includes the same objects and light sources as FIG. 3A, but also includes strongly rendered caustics.

FIG. 4A illustrates a scene that includes the same objects and light sources as FIG. 3A, and also includes poorly rendered caustics.

FIG. 4B illustrates a scene that includes the same objects and light sources as FIG. 3A, and also includes partially rendered caustics, according to the present disclosure.

FIG. 4C illustrates a scene that includes the same objects and light sources as FIG. 3A, but also includes realistically rendered caustics, according to the present disclosure.

FIG. 7A is a graph showing a one-dimensional illustration of path space guiding, according to the present disclosure.

FIG. 7B is a graph showing a guided probability density function that captures features not shown in the original probability density function, according to the present disclosure.

FIG. 7C is a graph showing the converged guided probability density function, according to the present disclosure.

DETAILED DESCRIPTION

Figure 1A:
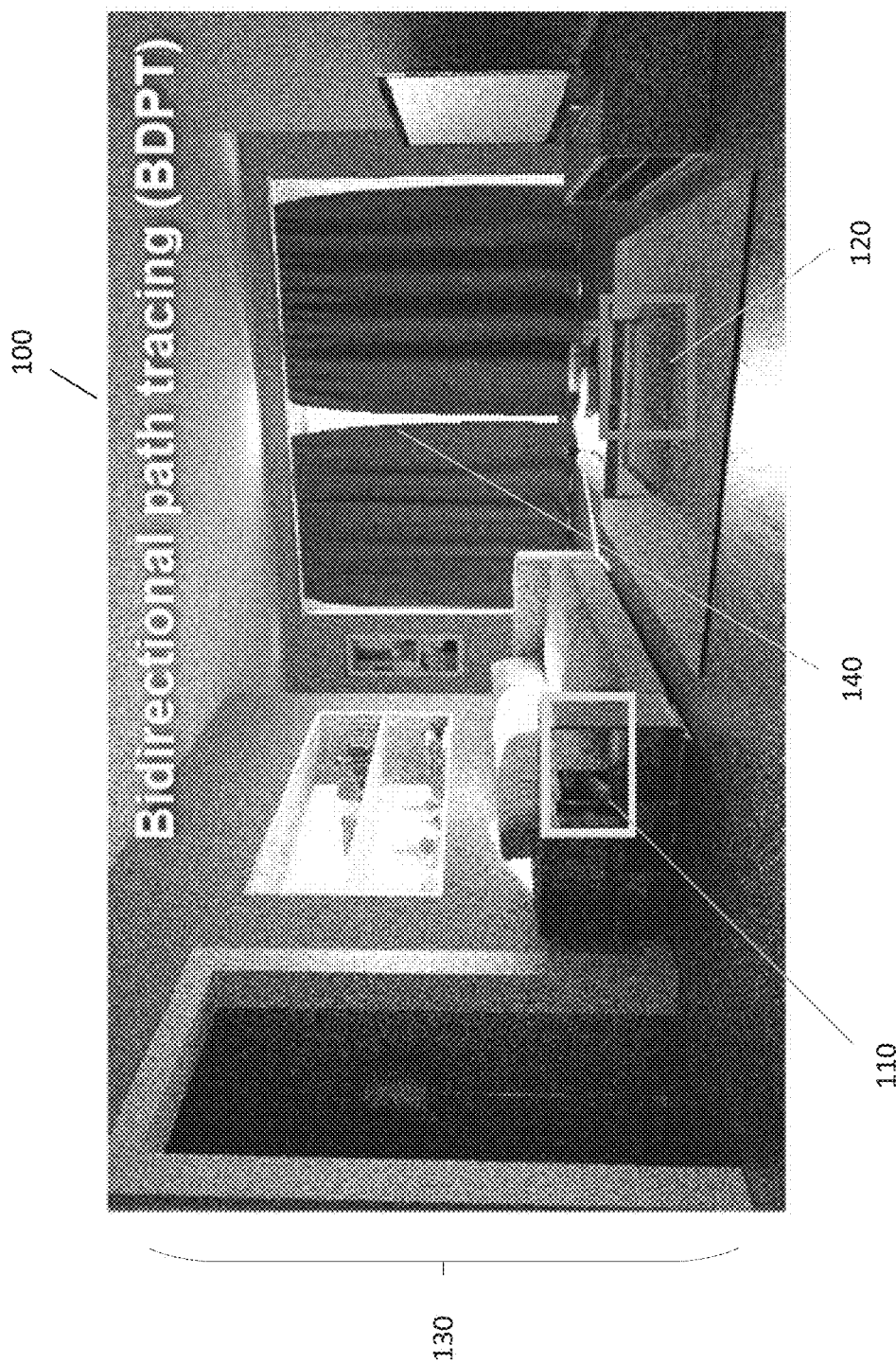
FIG. 1A is an example scene that has been rendered using bidirectional path tracing (BDPT).

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As used herein, the term "path guiding" refers to systems, devices, or methods that use a global knowledge about the scene to distribute light transport paths for rendering of the scene. This knowledge—more specifically an approximation of radiance fields in the scene and additional sampling statistics derived therefrom—is learned from previous samples or in a pre-process step. As the rendering system incrementally constructs paths vertex by vertex, the path guiding method biases random decisions taken in the process to guide the paths towards important regions in the scene. In these regions, paths are disproportionately likely to make significant contributions to the image. The method can bias or change the probability of multiple decisions along each path, such as choosing direction after each scattering event, free path sampling in volumes, absorption, or choosing of a light source for connection. Note, that biasing in this sense does not introduce bias (systematic error) in the image but results in the expected (e.g., more correct or more visually accurate) solution.

Path guiding techniques may be classified according to their application. Path guiding can aid path tracing where path sampling starts at the camera as well as light tracing where sampling starts at light sources. For example, path tracing is the most implemented algorithm in production. However, path tracing in production scenes should efficiently handle sampling many lights, occlusion, indirect illumination, glossy materials, and ideally deal with caustic lighting (i.e., reflection of a light source from a specular reflector, or refraction of the light source through a transparent (non-scattering) refractor). Accurate rendering typically requires large numbers of sample paths, which in some cases may be computationally prohibitive. Various path guiding methods have been developed to aid all these sampling problems. The path guiding method of the present disclosure may be used for efficient sampling of both direct illumination and indirect illumination and may be particularly beneficial in the rendering of caustics—a special indirect illumination type that is extremely difficult to render by path tracing without directional guiding. In some implementations, the path guiding method also performs well on glossy materials.

The path guiding method can learn to sample optimal path lengths and even suggest when to split the traced paths in order to achieve better rendering performance, which is important for efficient sampling of indirect illumination. For this purpose, some implementations may employ guided Russian roulette and/or path splitting. The path guiding method may also provide benefits in guided emission for light tracing and photons, which enables the path guiding method to be employed in scenes of production scale. In some implementations, the path guiding method may also be applied to bi-directional path tracing algorithms. Various guiding solutions can be employed without departing from the spirit of the present disclosure.

Computing direct illumination efficiently at every point in the scene is needed for light transport performance. Sampling of direct illumination may for example involve choosing the last segment of the path that is connected to a light source. It is important to realize that inefficient computation of direct illumination will also result in poor rendering of indirect illumination.

In most rendering systems, two sampling strategies may be employed for computing direct illumination. A rendering system may either rely on hitting a light source with finite area or finite solid angle by unidirectional sampling (e.g., a reflected ray intersects the light source), or the rendering system may explicitly sample a position/direction at the light source—a strategy known as next-event estimation (NEE). These two strategies are combined by multiple importance sampling (MIS), which weighs each sample contribution. The path guiding method of the present disclosure may therefore include an adaptive method for sampling in the space of paths, and as such it may be configured such that it learns to improve both unidirectional and NEE sampling. In fact, various factors can be learned from previous samples.

For unidirectional sampling, methods may in some cases be the same as for indirect illumination. The path guiding method can learn directional distributions of direct illumination (or distributions that combine both direct and indirect illumination), and cache them within the scene. These directional distributions can then be used for sampling reflected rays which, in turn, increases the chance that a ray hits the light source. The benefit of these directional distributions is that they are "aware of" (i.e., contain information about) occlusion in the scene. However, this strategy may be inferior to next-event estimation, provided there is only one light source in the scene and no occlusion between an illuminated surface and the light source.

However, in production it is often necessary to deal with scenes that contain numerous occluded light sources. This poses a challenge for next-event estimation. To deal with a large number of light sources with various geometric configuration and orientation, it is common to use some sort of hierarchical light source clustering and select a cut with candidate lights from which one light is sampled. However, these approaches are not aware of occlusion, which can be learned for each scene region to guide the light selection.

Yet another issue connected with NEE is the question how many samples should be taken take per one end vertex where the direct lighting is estimated. If the estimate is noisy, it may be desirable to increase the number of samples, and thus amortize the cost of tracing the whole path up to the position of the estimate. On the other hand, taking the NEE sample can be relatively costly as it usually includes descending through the hierarchy of lights. As a result, in regions where the direct illumination is dim (or completely occluded), it may be desirable to decrease the number of samples to a bare minimum in order to save time. This number can even drop below 1 yet stay above 0, so that the path guiding method only takes an NEE sample occasionally. In the same spirit, the path guiding method can even learn how to distribute samples between distant lights and area lights.

Statistics needed for optimizing the NEE sample rates can be stored in caches within the scene (e.g., partitioning of the scene), which are used for guiding of indirect illumination. Thus, with most guiding solutions it is possible to amortize the cost associated with the search in the cache for the most relevant guiding record. The selected record will have the necessary statistics for sampling both direct and indirect illumination.

The path guiding method may also consider illumination due to light that has scattered at least twice before reaching the camera. While such illumination appears smooth in the scene, it can be very difficult for a path tracer to sample it efficiently. In essence, this happens due to (a) inefficient directional sampling and (b) sub-optimal path-length sampling. Both of these problems can be mitigated by path guiding.

To explain inefficient directional sampling, the path guiding method may consider a scene with lights that are close to geometry causing strong reflections on rather diffuse walls. Because these reflections occupy rather small solid angle when observed from a distance, traditional sampling only occasionally finds the directions from which the strong light is coming. This occurs because such sampling is based on surface properties and thus, for example on diffuse surfaces, spreads samples into a wide solid angle.

There are multiple different path guiding techniques available for directional guiding which learn optimal directions for sampling the rays in angular (directional) domain, some of which can handle a mix of low and high frequency illumination and can thus be made practical for production. Directional guiding may also employ neural networks. However, network training relies on using GPUs and yet, the method approaches diminishing returns.

Path sampling can benefit from directional guiding as long as the path guiding method can efficiently decide whether it is worthwhile to continue tracing the path or to terminate it and start tracing a new path from the camera. It may be important for the method to guide this decision, as it may be important to achieving high performance in simple scenes where most of the energy is transported over short paths, as well as in more complex scenes where light undergoes many scattering events before reaching the camera. This problem is addressed by guided Russian roulette and splitting (also known as adjoint-driven Russian roulette and splitting). Methods for directional guiding may be classified for example according to their capability of handling surfaces with low roughness or volumes with high mean cosine. Ideally, to generate high quality samples, choosing direction at a scattering event should consider the product of incident illumination and BSDF (or phase function in volumes). In some implementations, guiding solutions based on parametric mixtures are designed explicitly to handle glossy and glossy-to-glossy transport.

In some implementations, path guiding is based at least in part on keeping full previously sampled paths inherently adjusted to sampling the product distribution. In some implementations, the method does not sample the product distribution but rather guides paths based on incident illumination, which may be beneficial for diffuse surfaces. In some implementations, the method finds a fixed, global, threshold on roughness below which guiding the samples according to incident illumination is almost always inferior since response of the material or phase function would always yield almost zero contribution except for a small set of directions. Where such materials are rendered, the method may simply resort to sampling the phase function of the material. Another option is using sampling-importance-resampling (SIR), although distributing samples may take more time as it often requires sampling of several candidates first and then a resampling step. A more pressing issue associated with this method is that the method may not be able to evaluate an exact probability of sampling a given direction, which is problematic for an MIS combination of unidirectional contributions and next-event estimation.

Still another option is for the path guiding method to learn two sets of distributions in the scene. One set of distributions may for example be in the camera frustum that would learn the product distribution from samples with evaluated BSDF/phase function and would be used for guiding scattering of primary rays. The other set of distributions may for example be used for guiding subsequent bounces according to standard path tracing or ray tracing methods. In some implementations, guiding distributions may be represented as quad trees or product trees. Other implementations include parametric mixtures, histograms, adaptive quad trees, full paths, or combinations thereof.

In an example, the system may determine a bounding box for a scene based on a frustum of a virtual camera, and then generate a path-traced "oracle" image of the scene (or, more properly, a portion of the scene within the bounding box) by projecting a plurality of oracle light paths from the virtual camera, and storing a subset of the oracle paths that exit at a light source. The system may then remove objects from the scene that are poorly sampled by the oracle paths (e.g., sampled less than a predetermined threshold). Next, the system may generate a "mask" or probability density function (PDF) for the light source, based on the subset of oracle paths, that assigns an emission probability for each position on the light source. The system may then refine the mask or PDF by generating successive images of the scene by repeatedly: (a) generating a path-traced image using the masked light source to generate a plurality of light paths; (b) storing the light paths that exit at the virtual camera; and (c) modifying the emission probability of each position on the light source based on a cumulative average (e.g., across a plurality of images) of the density of light paths emitted from that position that exit at the virtual camera. The system may then render one or more scene images.

In a different example, the system may place a virtual camera within the scene, and generate a mask for a light source that assigns an emission probability to each position on the light source (e.g., based on a density of light paths emitted by the virtual camera exiting at that position on the light source or, alternatively, based on a density of light paths emitted from that position on the light source that exit at the virtual camera). The system may then generate a path-traced image by using the masked light source to generate a plurality of light paths and storing a subset of the paths that exit at the virtual camera. The system may then use quad trees to identify a further subset of paths that are poorly sampled (e.g., sampled less than a pre-determined threshold). For at least some light paths of this further subset, the system may compute a distribution (e.g., a 2D Gaussian distribution) for each vertex, sample the vertex positions from the computed distributions, and then construct a guide path from the sampled vertices. Next, the system may modify the guide path by iteratively resampling the positions of the vertices, until the guide path exits at the virtual camera. The system can then construct a path-guided image using only the modified guide paths and combine the path-traced image with the path-guided image to form a fully rendered scene image storable in computer memory.

The present disclosure aids substantially in the computation and rendering of indirect lighting of a scene, by improving the appearance of diffuse reflections, refractions, and caustics. Implemented on a computing system in conjunction with a simulation system, animation system, or 3D scanning system, the path guiding method disclosed herein provides a practical means of rendering scenes involving complex lighting scenarios. This improved image rendering transforms a less realistic, more resource-intensive modeling and rendering process into a more realistic, less resource-intensive process, without the normally routine need for an artist or animator to apply manual corrections or dramatically increase the number of traced paths in the rendering. This unconventional approach improves the functioning of the computing system that performs the rendering.

The path guiding method may be implemented as a software program, at least some outputs of which may be viewable on a display and operated by a control process executing on a processor that accepts user inputs from a keyboard, mouse, or touchscreen interface, and that may be in communication with a rendering process and a simulation, drawing, or 3D scanning process. In that regard, the software program performs certain specific operations in response to different inputs or selections made at different times. Certain structures, functions, and operations of the processor, display, sensors, and user input systems are known in the art, while others are recited herein to enable novel features or aspects of the present disclosure with particularity.

These descriptions are provided for exemplary purposes only and should not be considered to limit the scope of the path guiding method. Certain features may be added, removed, or modified without departing from the spirit of the claimed subject matter.

FIG. 1A is an example scene 100 that has been rendered using bidirectional path tracing (BDPT). Light transport in this scene is difficult for sampling because light (e.g., sunlight) enters the room 130 through a small gap 140, making it difficult to accurately trace all of the relevant light paths. As a result, the scene 100 appears grainy or noisy. Two reference detail regions 110 and 120 are marked in the scene 100.

Figure 1B:
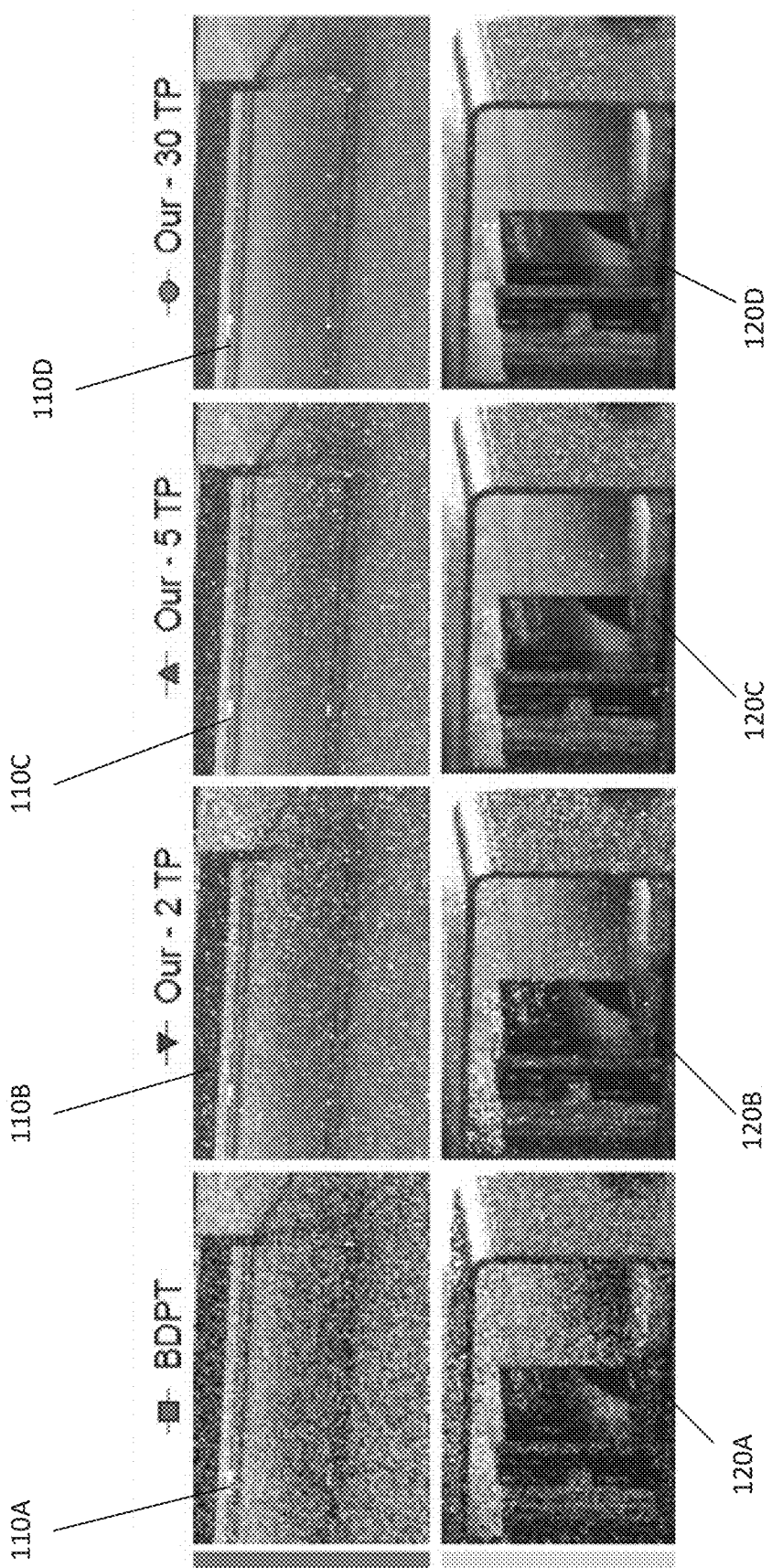
FIG. 1B illustrates the detail regions from FIG. 1, rendered using both BDPT and path guiding, according to the present disclosure.

FIG. 1B illustrates the detail regions 110 and 120 from FIG. 1, rendered using both BDPT and path guiding. 110A and 120A are the original detail regions, rendered using BDPT. As can be seen, the rendered images 110A and 110B are grainy or noisy. 110 B and 120B are the same detail regions, rendered using a two-training-pass path guiding method. 110C and 120C are the same detail regions, rendered using a 5-training-pass path guiding method. 110D and 120D are the same detail regions, rendered using a 30-training-pass path guiding method. As can be seen, increasing the number of passes or iterations in the path guiding method reduces the noise or graininess of the image. However, there does come a point of diminishing returns, where additional iterations can require additional time and computing resources, while contributing less and less to the overall benefit of the path guiding method.

FIG. 1B illustrates the benefits of path guiding which learns from previous samples on a scene rendered by bi-directional path tracing (BDPT). When path guiding is implemented in a unidirectional path tracing in systems with next-event estimation, it is a question what quantity should be stored in the directional distributions. The answer depends on how well the next-event estimation can importance sample the direct illumination. If the next-event estimation is almost perfect and can handle occlusion as well as multiple light sources in the scene, a viable choice may be to ignore direct illumination completely and adapt only to indirect illumination. Otherwise, if direct illumination is included, which can be handled well in this example, the path guiding method may be distracted from focusing on indirect illumination features, since most guiding methods allocate limited resources (guiding resolution) to a subset of angles that show high illumination. This can introduce unwanted variance into the indirect illumination. Even worse, this scenario can also introduce variance into direct the illumination itself, because unidirectional guiding for indirect illumination, although it may be an inferior strategy, may nevertheless be good enough that it is not completely down-weighted by MIS.

With guiding improvements to next-event estimation discussed herein, the described methods can greatly improve the next-event estimation outcomes, resulting in greater realism (e.g., less noise, improved lighting) for the rendered image. However, practical experience shows that such methods occasionally result in corner cases in production scenes, which may be mitigated if an alternative strategy for sampling direct illumination is employed instead. Moreover, some shots might be illuminated by volumetric lights and large emissive particle systems, which may be challenging for handling in light hierarchies and may require more specialized methods.

Multiple importance sampling with balance or power heuristics may in some cases be sub-optimal. If a perfect or near-perfect strategy is combined with a moderate one, the noise of the estimator is increased. The dilemma of whether to include/exclude direct illumination may be decided in several ways. In one example, the path guiding method can keep separate distributions for each type (one for direct illumination and one for indirect) in the same spatial region in the scene. This would yield strategies for unidirectional sampling and one NEE strategy. One straightforward solution to this problem is including direct illumination in the distribution but weighting it by MIS weight. If next-event estimation is found to be a good strategy for a given direction, then unidirectional samples will be down-weighted, and unidirectional guiding can focus on indirect illumination for important directions that are not sampled well by NEE.

Figure 1C:
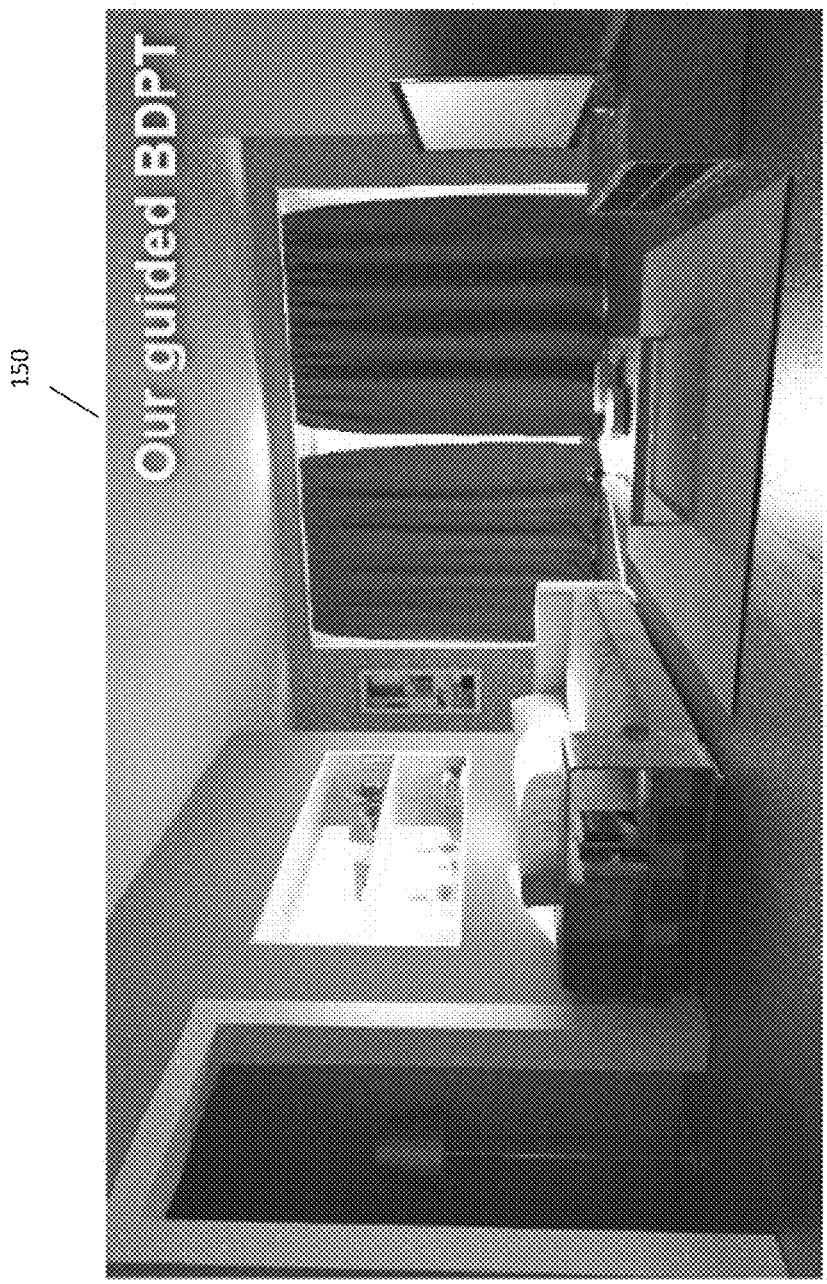
FIG. 1C is an example scene that comprises the same content as FIG. 1A, but has been rendered using path-guided BDPT, according to the present disclosure.

FIG. 1C is an example scene 150 that comprises the same content as scene 100 of FIG. 1A but has been rendered using path-guided BDPT. Path guiding significantly reduces the noise that is visible in scene 100 of FIG. 1A, using traditional BDPT, such that scene 150 exhibits substantially less noise. The path guiding performance depends on the number of samples used for learning the global information about the transport in the scene as shown in the insets and plots.

Figure 2:
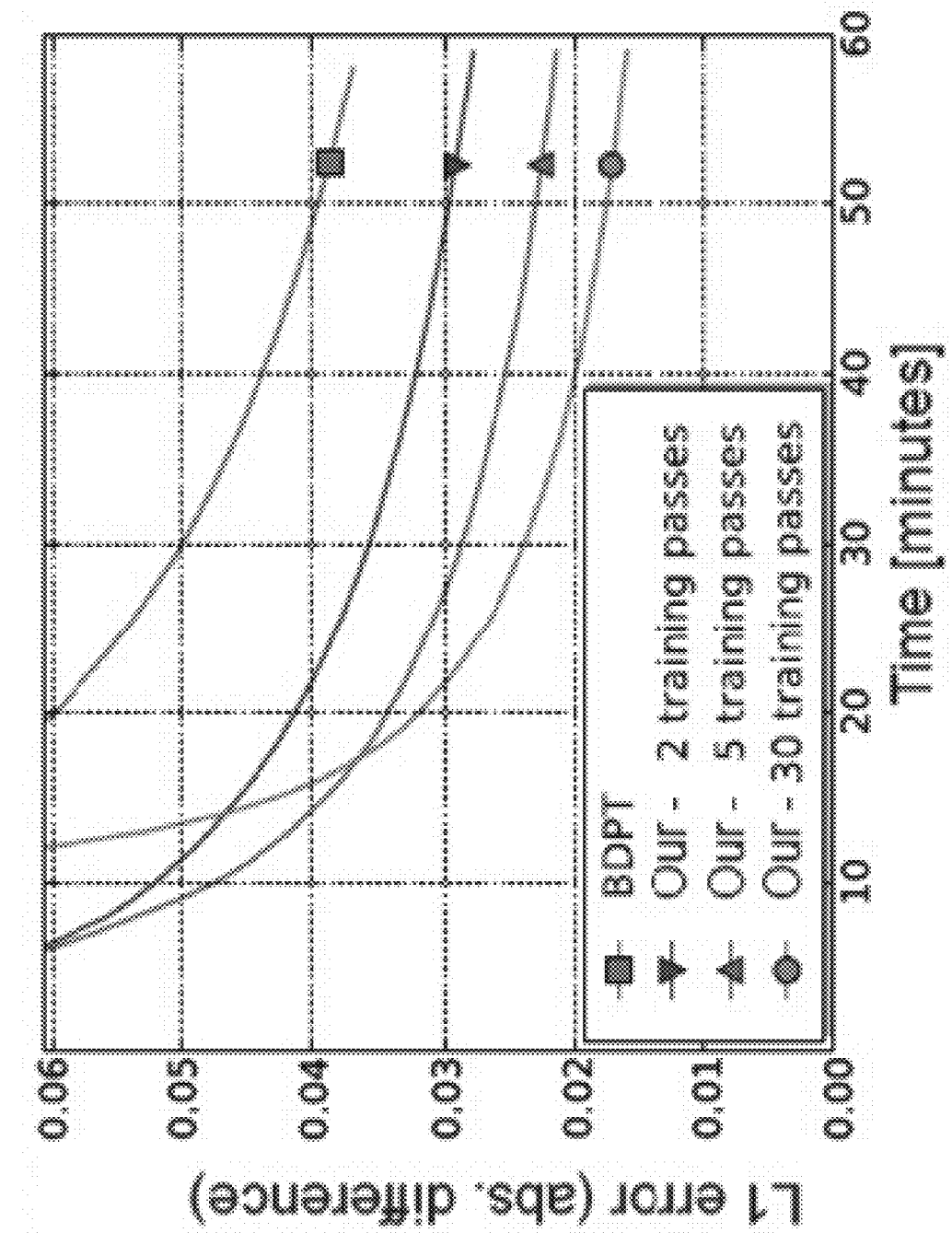
FIG. 2 is a graph showing the error of a rendering process for unmodified BDPT and for path-guided BDPT, according to the present disclosure.

FIG. 2 is a graph showing the L1 error (absolute value of the difference between an image and a reference image) of a rendering process for unmodified BDPT, and for path-guided BDPT using 2, 5, and 30 training passes, respectively. As can be seen in the graph, a 5-pass path guiding method converges more quickly than either a 2-pass or a 30-pass path guiding method, indicating that this may be a good method for quickly rendering a high-quality image. However, after approximately 18 minutes of rendering time, the error of the 30-pass path guiding method drops below the error of all other shown methods, indicating that if sufficient time and computing resources are available, the 30-pass method may produce the overall highest-quality image. Notably, the error difference between the 5-pass and 30-pass path guiding methods is smaller than the difference between the 2-pass and 5-pass methods, indicating that beyond five training passes, additional training passes provide diminishing benefits in final image quality.

FIG. 3A illustrates a scene 300A that includes specular reflections, diffuse reflections, shadows, and refraction through transparent materials, without properly rendered caustics. Caustics are a type of indirect illumination that can benefit from directional path guiding. By their nature, caustics comprise light that is cast from a small light source and focused through refraction or by reflection from a curved, specular object. Caustic light is notoriously hard for path tracing systems to sample because the light can propagate through extremely small solid angles. Quite often, in production rendering systems, caustic light transport should often be clamped to avoid unreasonable rendering times. However, scenes that would feature caustics in the real world can look unrealistic when rendered through computer graphics, if this kind of light transport is completely omitted, as shown in FIG. 3A. This is the default behavior in many path tracers, which can lead to unsatisfactory results in a production environment. In fact, for many viewers, an absence of caustics around specular objects can trigger a strong feeling of artificiality, similar in magnitude to the feeling they would report if the objects were missing shadows. Image 300A has been rendered with 1024 samples per pixel.

FIG. 3B illustrates a scene 300B that includes the same objects and light sources as scene 300A, including the same specular reflections, diffuse reflections, shadows, refraction through transparent materials, but also includes weak caustics 310B. Some production path tracers use strong filtering of caustic transport to retain some amount of lost energy, as shown here for example in FIG. 3B. However, this method does not produce caustics that match the real world, and so may still seem unrealistic to viewers.

FIG. 3C illustrates a scene 300C that includes the same objects and light sources as scene 300A, including the same specular reflections, diffuse reflections, shadows, refraction through transparent materials, but also includes strongly rendered caustics 310C. In this example, fully path-traced caustics provide a more realistic appearance. With unlimited time and computing resources, caustics may be realistically rendered using BDPT. However, unlimited resources are rare in a production environment. One benefit of path guiding is the accurate rendering of caustics with only a small additional requirement for computing time.

FIG. 4A illustrates a scene 400A that includes the same objects and light sources as scene 300A, including the same specular reflections, diffuse reflections, shadows, refraction through transparent materials, and also includes poorly rendered caustics. While rendering caustics by regular path tracing is possible in theory, the cost is unacceptable in practice. However, these interesting effects can add another level of realism and thus production systems usually offer special solutions. For example, eyes of characters may feature caustics visible through a refractive surface (so-called specular-diffuse-specular transport). This specific case (used for example in eyes, water droplets, etc.) can be handled reasonably well by manifold exploration, although this approach can run into problems on geometry with highly varying curvature or in the presence of occlusion. Another, more complex option for rendering the specular-diffuse-specular transport is through the use of photon mapping. However, photon mapping needs a high density of photons sampled within the object (e.g. an eye or water droplet), which is not easy to achieve in scenes of production scale where such features usually occupy only a tiny fraction of the scene, leading to noisy results.

FIG. 4B illustrates a scene 400B that includes the same objects and light sources as scene 300A, including the same specular reflections, diffuse reflections, shadows, refraction through transparent materials, and also includes partially rendered caustics. A convenient solution for rendering caustics is extending path tracer by directional path guiding, which is a general way to aid sampling of the whole range of indirect illumination effects. However, one problem of path guiding on this extremely difficult transport is that it generates fireflies (e.g., transient changes in the intensity of a caustic pixel from one rendered frame to the next), which again lends a noisy look to the rendered image 400B.

FIG. 4C illustrates a scene 400C that includes the same objects and light sources as scene 300A, including the same specular reflections, diffuse reflections, shadows, refraction through transparent materials, but also includes realistically rendered caustics. The fireflies, discussed above, capture only low amount of energy and can be clamped in practice without having a substantial impact on the appearance of the rendered image, leaving a uniform noise that is suitable for de-noising, thus yielding a realistic image 400C.

Figures 5A, 5B:
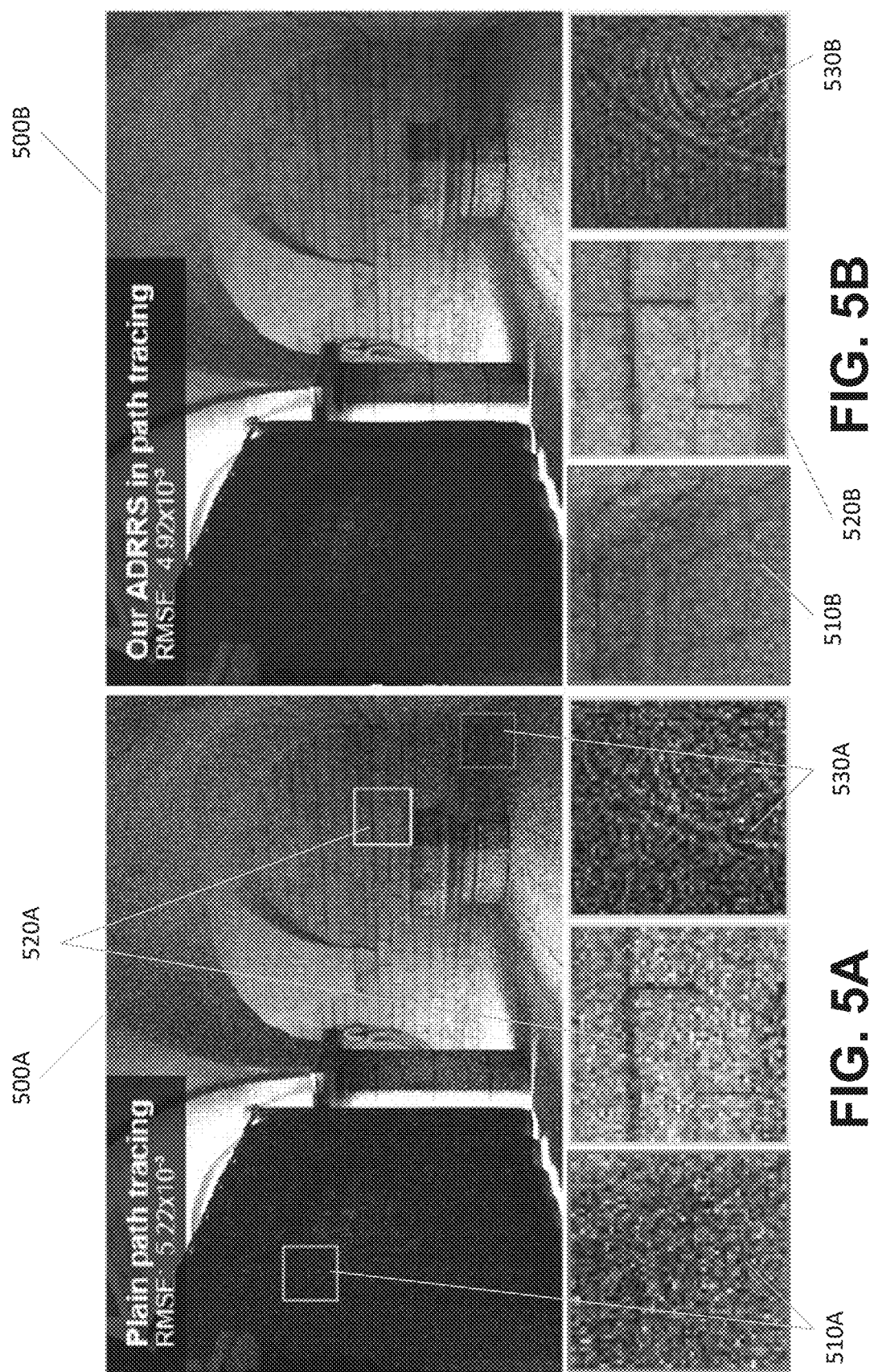
FIG. 5A illustrates a scene that includes indirect lighting and occlusions, rendered using path tracing, and includes detail regions where noise is evident.
FIG. 5B illustrates the same scene as FIG. 5A, including indirect lighting and occlusions, using an example of path tracing that employs ADRSS.

FIG. 5A illustrates a scene that includes indirect lighting and occlusions, rendered using path tracing, and includes detail regions 510A, 510B, and 510C where noise is evident.

In scenes where light is scattered many times before reaching the camera, good importance sampling (and thus noise reduction) can be achieved by guided (e.g., adjoint-driven) Russian roulette and splitting (ADRRS). Using traditional albedo-driven Russian roulette in path tracing may be sub-optimal under these conditions, because paths are either terminated too soon or time is wasted on sampling overly long paths.

Path sampling can benefit from directional guiding as long as the method can efficiently decide whether it is worthwhile to continue tracing the path, or whether the method should terminate the path and start tracing a new one from the camera. Traditionally, this decision, called Russian roulette, has been driven by the albedo of surfaces or volumes. However, scattering light many times in the scene before it reaches the camera can result in premature termination of paths that significantly contribute to the image. As a result, the contribution of these paths turns into strong noise. This issue may also arise in scenes with fully path-traced sub-surface scattering, when a path emerges from an object and is terminated at the next vertex without being able to connect to a light. On the other hand, albedo-driven termination may cause the rendering system to spend too much time on tracing reflections between materials with high albedo (white walls, snow, blond hair, white fur, etc.).

To remedy this, some implementations employ introduced guided Russian roulette and splitting (also known as adjoint-driven Russian roulette and splitting), which allows the path guiding method to optimize path termination by using global knowledge about the scene learned from previous samples. Moreover, path guiding can use this knowledge to split the path in important regions which are then, in turn, covered by more samples. Increased efficiency follows from the fact that path splitting amortizes the work spent on tracing the whole path up to the splitting point.

The more scattering events along a given path, the greater benefit the guided Russian roulette and splitting provides. This is a reason why guided Russian roulette and splitting can be quite important for efficient volumetric transport where average path length is usually high.

FIG. 5B illustrates the same scene as FIG. 5A, including indirect lighting and occlusions, using an example of path tracing that employs ADRSS. This results in reduced noise, as can be seen in detail regions 510B, 520B, and 530B as compared with 510A, 520A, and 530A in FIG. 5A.

Using global knowledge about the scene clearly reduces noise in indirectly lit regions. Guided Russian roulette and splitting (GRRS) typically requires two kinds of estimates in order to work: (a) an estimate of the computed pixel value I, and (b) estimates of incoming radiance at each scattering event (i.e., path vertex) along the sampled path. Essentially, these two quantities are compared at every scattering event, to decide whether the path will be terminated, split, or will continue. Although these quantities may not be accurately known up front, this technique can work with relatively crude estimates.

There are many options for computing the pixel estimates I. Some implementations use a precomputation step to cache estimates of incident radiance in the scene and determined the pixel estimates I in a gathering step. However, this extends the time to first pixel and thus is not suitable for progressive rendering which immediately provides a preview of the computed image. As discussed below, forward learning guiding methods are inherently progressive because they learn while the image is computed. To avoid increasing the time to first pixel due to GRRS in guiding methods without pre-computation, the path guiding method may employ filtered current pixel estimates I, which are updated in-line as the light transport simulation proceeds. Some implementations that provide low-variance estimates may be implemented as a hierarchical sub-sampling of the image, with the estimates refined up to a pixel level as more paths are traced.

Some implementations can use even more advanced de-noising methods and may consider graphical processing unit (GPU) support if this is available. It may be desirable to achieve the pixel estimates quickly, without excessive reliance on computational resources that may be needed for the rest of the light transport simulation. An important insight is, that GRRS can provide significant time savings even when pixel estimates I are not precise. As discussed above, the path guiding method can also get estimates of incident radiance at every point in the scene. While these may also be only approximations of true values, practical implementation may start using GRRS only when the estimates are based on sufficient number of samples and have variance below a reasonable threshold.

Figure 5C:
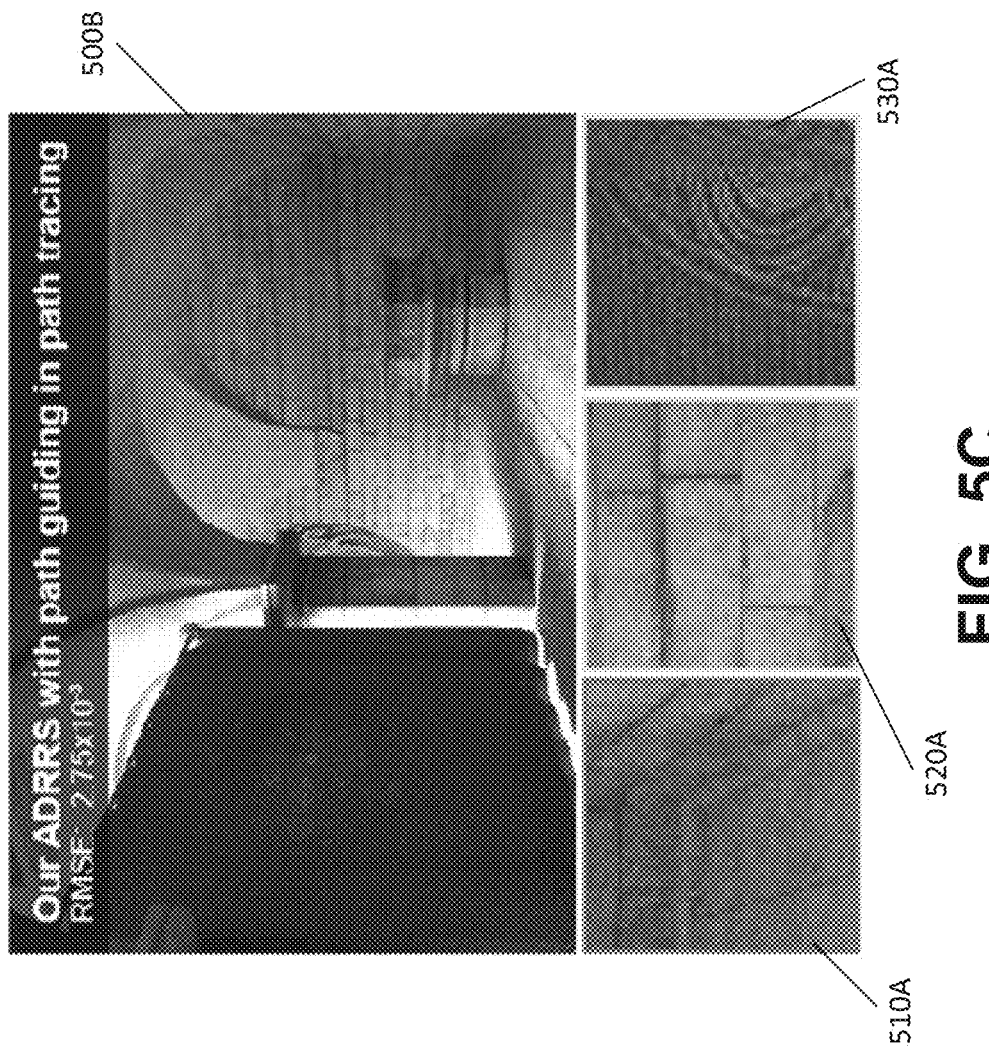
FIG. 5C illustrates the same scene as FIG. 5A, including indirect lighting and occlusions, using an embodiment that employs both path guiding and ADRSS, according to the present disclosure.

FIG. 5C illustrates the same scene as FIG. 5A, including indirect lighting and occlusions, using an implementation that employs both path guiding and ADRSS. This results in greatly reduced noise, as can be seen in detail regions 510C, 520C, and 530C as compared with 510A, 520A, and 530A in FIG. 5A.

Directional path guiding can be naturally combined with ADRRS, which results in synergic noise reduction. Using light tracing or photons for rendering caustics in production scenes is often not possible due to the size of the scene with respect to the portion of it that is visible in the camera frustum. Scenes are usually large for various reasons, some of them being (a) scenes are modeled for multiple different shots, (b) the camera is flying through the scene within one shot, or (c) to enable a director to change the camera viewpoint in a given shot during later production stages. Moreover, large open environments such as lakes and oceans with distant horizons often cannot be made smaller, because this would become visible in the image. Note, that this problem with large scenes projects even to bi-directional methods such as bi-directional path tracing, vcm/ups (vertex connection and merging/unified path space), or upbp (unified point beams and paths) which, in turn, can degrade to rather expensive path tracers.

Large scenes may be computationally prohibitive for photons when the chance of sampling corresponding important light paths is very small and thus, in turn, their density is low in important places within the camera frustum. In such cases, the sampling of light path emission from distant light sources is a major source of error. The distant light sources, like sun and sky or HDR (high dynamic range image) environment maps, are usually used to light open environments, but also interiors through openings and windows. A fundamental property of distant light sources is that emitted radiance from any direction is constant with respect to every point in the scene unless the point is in a shadow due to an occlusion. Thus, when a light path is emitted, the rendering system first needs to decide from what position the path should start, and in what direction to trace the first ray. One solution is to first sample a direction as if sampling distant lights for next-event estimation. Then the starting position is sampled uniformly within the area that spans the scene bounds, and which is perpendicular to the sampled direction. Furthermore, the position should be outside of the scene bounds, so that every unoccluded point in the scene has a chance to receive the illumination. However, this conservative strategy becomes sub-optimal (e.g., computationally expensive and/or visually unrealistic) quite fast with increasing extent of the scene.

Instead, path guiding can be used to learn the optimal sampling distribution for sampling the position of emitted light paths, based on the methods described herein. Such methods may for example be based on keeping a number of 2D guiding distributions for position sampling. Each distribution is relevant for a compact set of directions, while the union of sets forms the whole sphere of directions. In other words, after sampling the initial direction of the emitted light path, the method finds the corresponding guiding distribution for sampling the starting position.

Each guiding distribution may for example be proportional to the camera importance reflected from the scene within the corresponding set of directions. In this way, the density of photons near the camera will become high whereas there will be lower density in places further away or tilted with respect to the camera view direction. It should be noted that scene points which are not visible in the image, and do not even reflect indirect illumination into the image, do not receive any photons. For bi-directional methods, this may be combined with approaches that include MIS weights in the guiding distributions to detect where photons are not needed due to the existence of other, more efficient strategies.

For distant light sources, it may also be desirable to guide the direction selection of the initial ray based on the product of camera importance and emitted radiance. For example, the scene can be illuminated only by part of the environment while its brightest part might be actually occluded (for example, an interior illuminated through a window when the sun is on the other side of the building).

While some implementations train the guiding distributions for light tracing emission in the pre-processing step from paths traced from the camera, it may be desirable to extend the guided emission so that the 2D distributions are trained on-line from forward samples. However, there is a problem associated with this approach. Where the method has no a-priori knowledge about the target guiding distribution, the method can use the classical uniform sampling for emitting the light paths in the early stages. As a result, early samples that contribute to the image may have high variance and may in some cases become strong fireflies. As guiding explores the domain based on these first initial non-zero contributions, it starts to provide reasonable low-variance contributions. Thus, an image processor should also have to deal with the first noisy contributions that can be very difficult to "average out" from the final image. Note that for large scenes, the difficulty of sampling the emission position in a light/photon tracer becomes equivalent to sampling caustics due to a very small light source in the path tracer.

To address this issue, the method can run a very short phase when it "warms up" the guiding caches by emitting a batch of initial paths that are not splatted into the beauty image. Further, the method can cull the area which needs to be explored by guiding. A conservative approach is to take the area given by the scene (geometry) bounds (as described for the uniform sampling of emission positions at the beginning of this section). However, other implementations, within the short pre-pass, also trace a batch of paths from the camera which provide a point cloud that allows the method to determine the actual scene extent. This helps guiding to find nonzero contributions more quickly and more efficiently. Note that this problem of noisy initial estimates may also be mitigated by weighting contributions by the inverse of their variance.

As discussed above, path guiding allows efficient rendering of directional dependent effects like caustics or indirect reflections of light sources that are close to geometry using only a path tracer. These are examples of effects that otherwise require more complex bi-directional transport algorithms, such as vcm, that combine paths traced from lights and paths from camera.

Being able to use a path tracer means the method is suitable for production use, as path tracing may be the most favored light transport algorithm. This is true not only because it is relatively simple to implement, but also because it can accommodate many tricks that are difficult or impossible to incorporate into bidirectional algorithms. For example, one can completely change shading for indirect illumination or increase roughness after multiple scattering events. Another example is so call point-of-entry sub-surface scattering when the volume properties are derived from a texture on the object boundary.

These tricks usually depend on the path prefix, which makes it challenging to handle within strict bidirectional constraints. When tracing paths from light sources it is not clear what scattering probabilities one should use unless the path is connected to the camera. Also, path evaluation is deferred until the full path is sampled. Another pressing issue of bi-directional methods is that they usually double the number of traced paths per one progression, and also spend some time on their combination. This is not a problem when the extra cost is amortized in difficult transport scenarios by significant decrease of noise in each progression which, in turn, results in faster a render thanks to the decreased total number of progressions. Progressions typically involve a fixed number of paths, usually equal to the number of pixels for both path tracer and light tracer. However, the majority of production scenes feature such conditions that many contributions of bi-directional combinations are down-weighted (and thus discarded), meaning that path tracing is a better choice for these conditions.

However, bi-directional algorithms can also be aided by path guiding to get faster renders and remedy some of their issues. With guided emission, a bi-directional algorithm can deliver light paths in front of the camera so that a combination of paths, which is the primary advantage of bi-directional algorithms, is even possible. Moreover, the path guiding method can guide all sampling decisions along each path (e.g., paths from the camera as well as paths from light sources). However, in some cases guided path tracing is approximately as efficient as guided bi-directional algorithms in the challenging scenarios such as that shown in FIG. 5, meaning that many paths are redundant and their contribution is strongly down-weighted by MIS. Because bi-directional algorithms are unnecessarily computationally intensive in most production scenes, path tracing may also be favored by many users as the default light transport algorithm.

Figure 6:
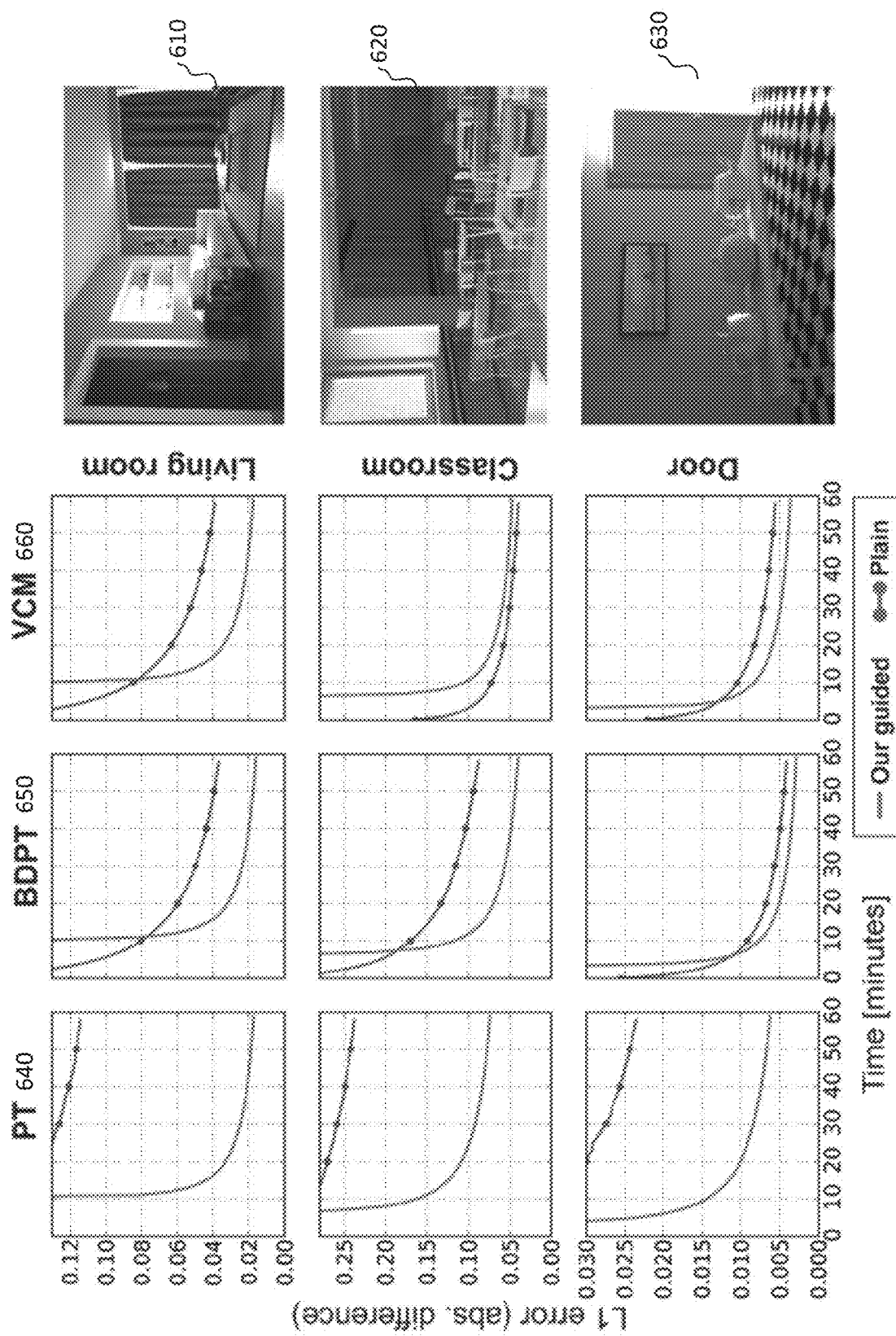
FIG. 6 shows the time dependence of error for three different scenes and three different rendering methods, in both guided and plain (unguided) cases, according to of the present disclosure.

FIG. 6 shows the time dependence of L1 error for three different scenes 610, 620, and 630 and three different rendering methods 640, 650, and 660, in both guided and plain (unguided) cases, using 60 minutes of rendering time. These graphs show that guided path tracing performs almost as well as guided bi-directional methods (e.g., bi-directional path tracing (BDPT) or vertex connection and merging (VCM)) in all three scenes, while also showing faster convergence and smaller error than the unguided methods. However, thanks to path guiding, bi-directional algorithms can be made relatively lightweight (e.g., less computationally intensive) if only path tracing with next-event estimation and light tracing, which connects to the camera, are retained. In this scenario "neither merge paths" are not interconnected. This implementation may be used for example in shots where caustic lighting is received by majority of pixels because light tracing with guided emission can still be superior to guided path tracing. This may be especially true for caustics coming from very tiny light sources.

Hereinabove, path guiding methods have been classified according to their application within light transport simulation. However, path guiding methods can differ in other aspects as well. For example, photons (i.e. paths starting from light sources) may be employed to guide sampling of camera paths. In some implementations, only camera paths are employed, both for learning and for rendering. In the present disclosure, the term "reverse" is used for the former since, for learning, it uses paths traced in the "opposite direction" (light to camera vs. camera to light) to paths that are actually guided, while the present disclosure uses "forward" for the latter since it uses paths from the "same direction" for both learning and guiding. In some implementations employing directional path guiding for indirect illumination, the reverse path guiding style may be adopted, while other implementations may follow the forward learning course. From a production perspective, there are some clear pros of the forward learning methods: (a) the pre-processing stage is minimal, and guiding information is learned on-the-fly with the rendered image (e.g., this implementation is friendly to progressive rendering, with a short time to first pixel), (b) one does not need to implement tracing of photons, and (c) learned guiding distributions are not affected by possible asymmetry of light transport due to production tricks.

On the other hand, reverse methods may benefit from inherently good distribution of photons for effects like caustics, provided there is a good emission sampling strategy as described hereinabove. In contrast, forward methods must provide good exploration strategy for discovered light transport features. To illustrate this, consider a caustic path that is revealed only after tracing many paths from the camera in the early stages of rendering. Such paths cannot be practically guided without a-priori information. Such a path will become a firefly due to its low probability of sampling, and forward guiding must ensure that its vicinity is explored efficiently to learn where to send subsequent paths. If the path guiding method explores only a small region, it may not discover important paths with sufficient probability, and this may result in more fireflies. A similar result may occur from exploring an overly large space because again, sampling important paths may have low probability if the search space is too large. The guided Russian roulette and splitting methodology described herein can work equally well with both approaches. Guided Russian roulette may for example be employed in a reverse method or in a forward learning method.

Reverse methods using parametric mixtures may be based on fitting distributions by density estimation methods, and thus it may be difficult to turn them into forward learning schemes. On the other hand, weighted Expectation-Maximization algorithms may be used for forward learning thanks to their ability to weight fitted samples. Thus, in turn, it could be possible to step aside the density estimations which have been verified by conducting early experiments within volumetric guiding.

Theoretical and practical advantages of path guiding methods include computational efficiency, low memory overhead, minimal overhead in simple scenes, robustness etc.

FIG. 7A is a graph showing a one-dimensional illustration of path space guiding. Parts of the integrand ($f$) are well represented by a probability density function or PDF ($P_u$). It may be beneficial to approximate the difference between the integrand and the PDF.

Volume sampling and Russian roulette can be used to guide the full paths in path space. Guiding new samples along full guide paths (instead of marginalized distributions which only guide low dimensional parts at a time) transparently includes all aspects of the high dimensional path space, including but not limited to path length, BSDF, incident illumination, and free distances in volumes. It also allows the use of simpler, uni-modal functions to represent a continuous PDF around guide samples. However, both marginalized caches and full paths come with advantages and drawbacks.

It can be important to sample all aspects of a transport path to effectively reduce variance. This naturally includes incident illumination, BRDF or phase function, and distances in volumes. Combining these from caches which store 2D marginals (for instance, only incident illumination or only BSDF) may incur multiplication of these stored signals. This can be computationally expensive, but full-fledged production renders sometimes computed on that scale can still be hidden between the dominating memory access costs caused by shading or ray tracing. In any case this approach may incur another reduction of accuracy: both the incident illumination and the BSDF fit may come with errors, which accumulate when multiplying the signals.

There are also more subtle aspects to consider when sampling a new path: the input samples "know" what kind of event happened. In the simplest case, this may be a reflect vs. a transmit event at a dielectric surface, for instance the cornea of a character's eye. Since the Fresnel terms indicate that most light will be transmitted, it may be beneficial to transmit a lot of light, to render a noise free image of the iris behind the cornea. However, there may be a few rays that capture direct highlights on the cornea. These may remain noisy for a long time in practice when importance sampling the low value of the reflecting Fresnel term. Previous samples carry the information whether reflect or transmit was a good idea at a specific point in path space. When projecting down to 2D directional distributions, such information is often lost.

Similar issues hold for Russian roulette as well: how long should a path be in certain regions of the scene? This information is contained in the set of previously traced paths. Resampled by their throughputs, they represent a mixture of path lengths with spatial resolution which indicate exactly how long a path is expected to be.

This leads to another path guiding method, based on caching all this information in its entirety: path space guiding. In this approach, no information about previous guide samples is discarded, and full paths are retained to construct a sampling density from. To make the memory usage tractable, it is helpful to select guide samples only where necessary, i.e. where the underlying base sampler (such as simple path tracing with next event estimation) does not yet yield a low variance estimator.

In FIGS. 7A-7C, an example integrand $f(X)$ is shown, and the existing MC estimator draws samples from the unguided PDF $P_u(X)$. More formally, the method can approximate the integral using the estimator as in Equation 1.

$$\langle I(X) \rangle_u = \frac{f(X)}{p_u(X)} \quad \text{(Eqn. 1)}$$

In Equation 1, the PDF $p_u$ represents the left smooth mode of the integrand well but misses the other features (two more modes).

FIG. 7B is a graph showing a guided probability density function that captures features not shown in the original probability density function. Thus, the additional guided PDF $p^0_g(X)$ which is iteratively refined for i=0, 1, . . . , and captures the differences between the integrand $f(X)$ and the unguided PDF $P_u(X)$.

FIG. 7C is a graph showing the converged guided PDF $P^1_g$. Guiding records ($Y_i$) are iteratively placed and then used to reconstruct a continuous guided PDF ($p^1_g$). These two PDFs can then be combined with multiple importance sampling (MIS, balance heuristic, or a related method) to yield a good Monte Carlo estimator for the integral. More precisely, a single-sample model can be employed with the balance heuristic, resulting in a combined estimator with a mixing weight u as in Equation 2.

$$\langle I(X) \rangle^i_g = \frac{f(X)}{u \cdot p_u(X) + (1-u) \cdot p^i_g(X)}. \quad \text{(Eqn. 2)}$$

Figure 8:
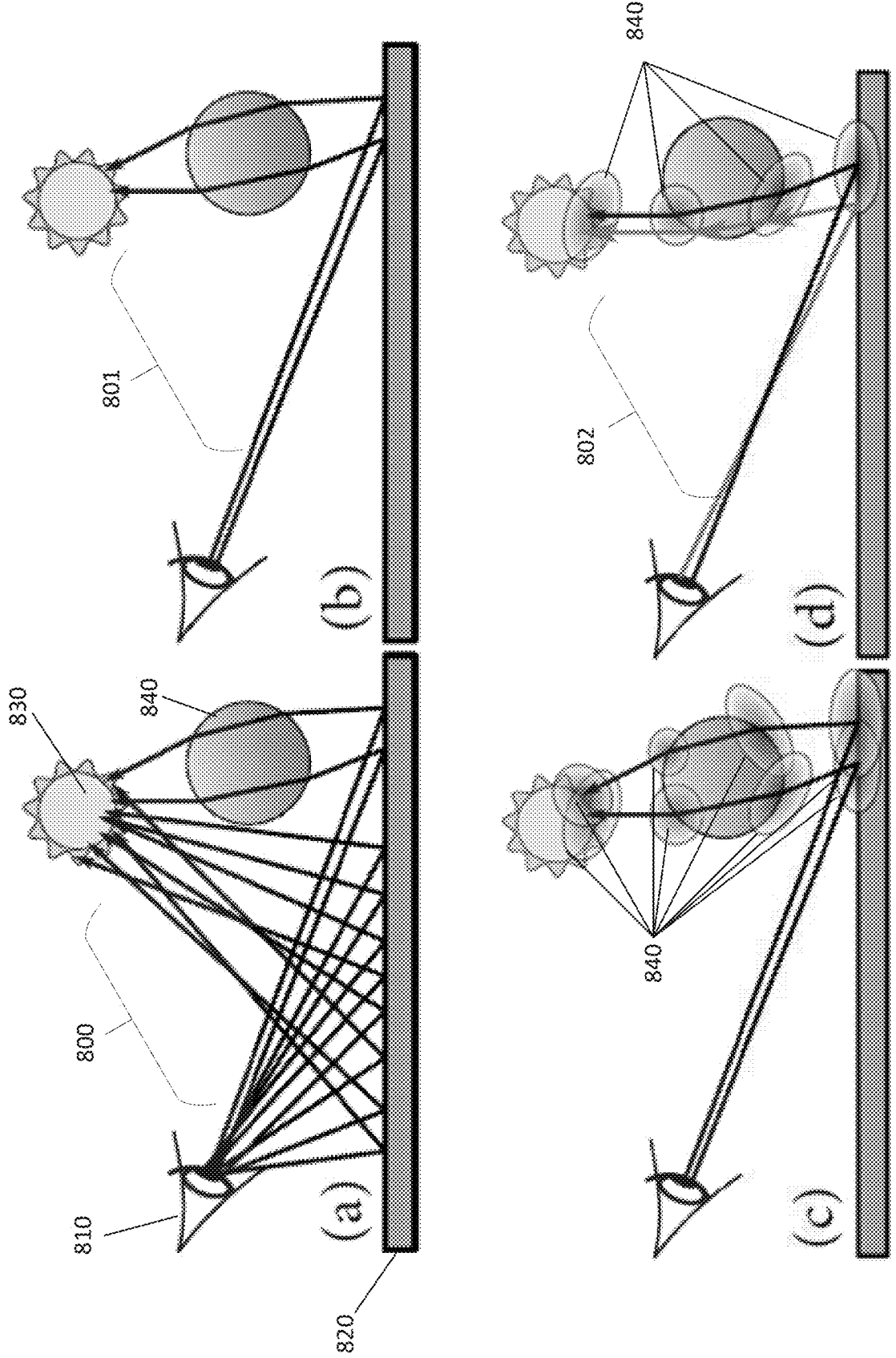
FIG. 8 is a schematic overview of the guiding method employing full paths, according to the present disclosure.

FIG. 8 is a schematic overview of the guiding method employing full paths. Visible are light paths 800 emitted from a virtual eye, camera, or sensor 810, reflecting off of a surface 820 to a light source 830. Some paths also refract through a transparent object 840. The path tracing method begins with all light paths 800 that are path-traced trajectories, depicted in (a). From these, the method selects the paths 801 that are most poorly sampled by the underlying Monte Carlo estimator, shown in (b). These may for example be paths that should contribute to caustic lighting effects and will serve as guide paths. For each of these guide paths, the method computes anisotropic reconstruction kernels 840 at every path vertex, to fill in the gaps between the samples. This is visualized in (c). To sample from this structure, the method first picks a guide path and then successively samples path vertices according to the reconstruction kernels (d), yielding new paths that are selected for greater importance to lighting effects within the image. Evaluating the PDF involves summing up the PDF associated with all guide paths that may create the given path.

The method proceeds as illustrated in FIG. 8. The method begins by letting Pu(X)=0 and effectively sampling X using only Pu(X) (FIG. 8a). From light paths 800, represented by X, the method selects only a few new guide paths Y (801) motivated by importance sampling: by first determining whether a path is an outlier causing high variance (via density-based outlier rejection. Only from these does the method pick the N with the highest contribution to the estimate in Equation 2. The method will iteratively add batches of guide paths $Y_j$ sampled from both Pu and the current guided PDF $p^i_g$ to the cache, and once they are added, the method keeps them unchanged until the end. This is illustrated for example in FIG. 8b.

The guide paths $Y_j$ (801) are turned into a continuous function using a Gaussian reconstruction kernel (as shown for example in FIG. 8c). The method uses a high-dimensional neighbor search to determine large enough reconstruction kernels to close the gaps between paths and to achieve smooth coverage. One challenge is that the PDF evaluation can become slow in Gaussian mixture models. Therefore, the method may use truncated Gaussian kernels to cull away samples efficiently.

To sample from the cache, the method first selects a guide path $Y_j$ using a cumulative density function (CDF) built on path weights $W_j$ which are updated every iteration i to reflect the new guided PDF $p^i_g(X)$. Then the method samples a new path vertex $X_v$ following the Gaussian reconstruction kernel $(\Sigma, \mu)_v$ around every guide path vertex $Y_v$ (as shown for example in FIG. 8d), starting at the sensor. This process yields guided paths 802.

In the subsequent iteration i+1, the method draws samples from both $P_u(X)$ and $p^i_g(X)$, with probabilities u and 1-u, respectively. No matter which technique was used, new samples will be considered to be recorded as new guide samples for the next iteration, depending on their contribution $\langle I(X) \rangle^i_g$.

Because $P_g(X)$ does usually not cover the full domain, in implementations, $P_u(X)$ forms a complete unbiased estimator, as in the example shown in the expression of Equation 3.

$$\forall X: f(X) > 0 \Rightarrow p_u(X) > 0 \quad \text{(Eqn. 3)}$$

This will not necessarily be the case for the guided PDFs $p^i_g(X)$ which may be zero in areas where the original estimator is deemed sufficiently good already. The method may employ a balance heuristic to combine the PDFs, as this may be close to optimal. The precise choice of combination heuristic may not significantly affect the final sampling quality, as the convex combination of both PDFs $P_u(X)$ and $P_i(X)$ adapts to be proportional to $f(X)$.

Figure 9:
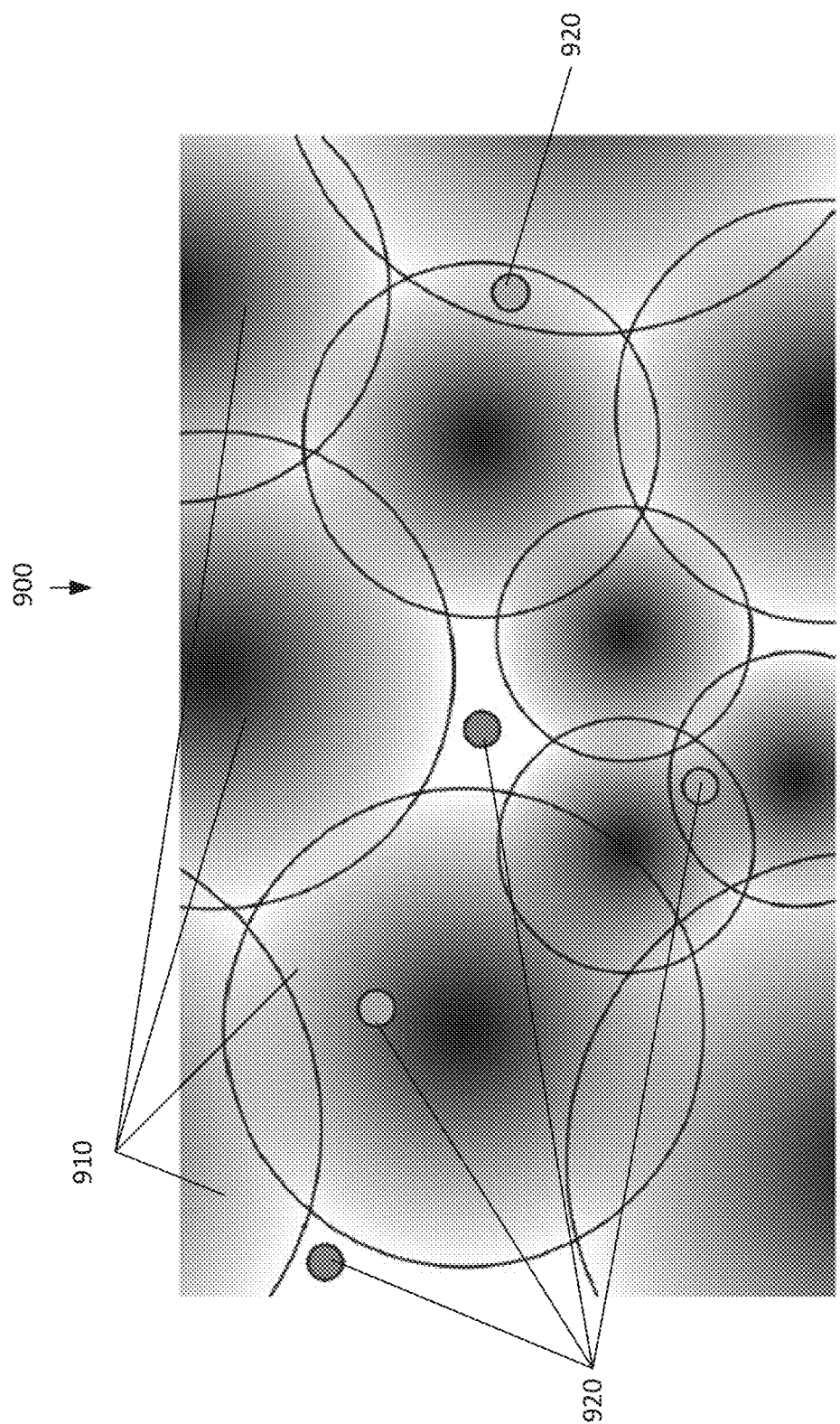
FIG. 9 illustrates an exemplary placement for guided path samples in a two-dimensional image space, according to the present disclosure.

FIG. 9 illustrates an exemplary placement for guided path samples 920 in a two-dimensional (2D) image space 900. Placing new samples 920 far apart from other samples is essentially a dart throwing method, which can be used to generate blue noise samples. While the guide path sampling does not explicitly search for minima (e.g., areas in between high-density regions, marked here as circles 910), it does increase the probability for samples to occur in these areas: a sample 920 marked in dark gray will have low PDF, resulting in a firefly sample if the function evaluation is high. Such a sample is likely to spawn a new guide path in the next iteration.

Guide paths may be computationally expensive: first, the method needs to store them, so it may be helpful to keep their overall number to a minimum. Second, PDF evaluation scales somewhat with the number of overlapping Gaussians. Fortunately, the culling due to the truncated Gaussians usually works quite well in reducing the number of minimally relevant samples. Some of this is because the Gaussians may be constructed to span only a certain number of neighbors. Still, it is helpful to carefully select guide paths.

This is done by looking at a screen space projection of the noise: density-based outlier rejection (DBOR) can indicate how "lonely" (e.g., isolated) a sample is in screen space. This is different than being lonely in high dimensional path space (in a way, every sample will be isolated there). As it happens, this is can be very important for the final image.

In 2D image space, this has an interesting connection to dithering methods which will create blue noise patterns. FIG. 9 shows a 2D image space 900. Sampling driven by Gaussians around existing samples will gather probability mass around existing samples. In areas right in the middle between samples, there will be a low probability density. If the function value is high in these areas, the probability to sample an outlier here is increased. This means that, in a stochastic sense, such a sample placement is similar to dart throwing.

Sampling paths may be fairly straightforward in this setup. Conceptually the method can simply choose a guide path, and then successively sample the next transport vertices starting from the eye. It is possible to support volumes natively in this context, but there are a few details as to including the BSDF for (near) specular events.

Figure 10:
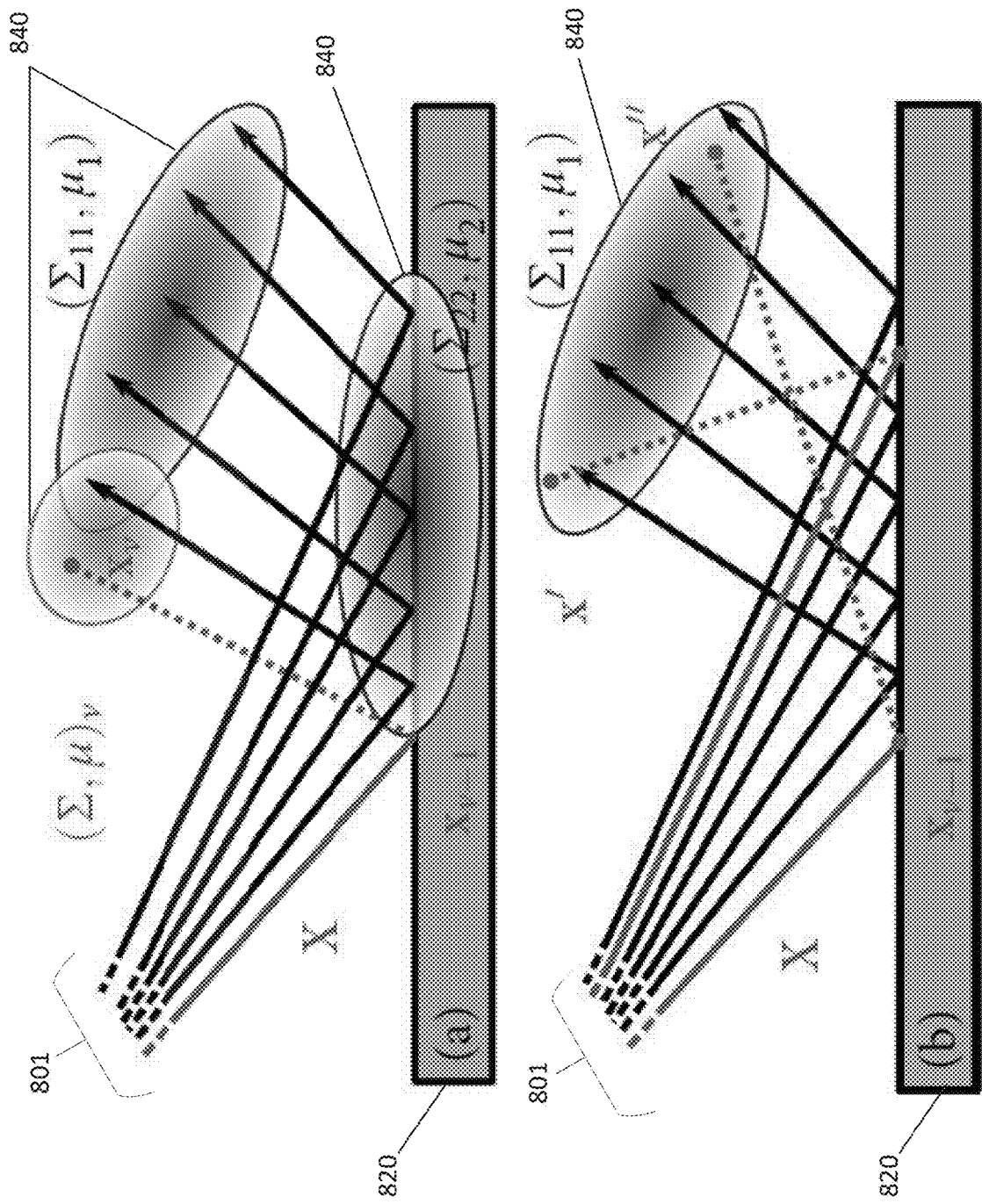
FIG. 10 illustrates the effects demonstrated in FIGS. 8 and 9, according to the present disclosure.

FIG. 10 illustrates the effects demonstrated in FIGS. 8 and 9. Visible are the guide paths 801, surface 820, and anisotropic reconstruction kernels 840. For most accurate sampling of $X_\nu$, the method may compute a covariance matrix (5×5 in this example, since $X_{\nu-1}$ is a surface point and $X_\nu$ is in a volume). One block in the matrix, $\Sigma_{11}$, expresses how $X_\nu$ should be distributed according to the collected data from the guide paths (shown in black). An image processor, already having a fixed previous vertex $X_{\nu-1}$, can then derive a conditional of a 5×5 Gaussian accordingly, resulting in a new distribution $N[\Sigma v, \mu_\nu]$. If there is a non-zero covariance between the coordinates of the guide path vertices $Y_\nu$ and $Y_{\nu-1}$, the conditional Gaussian $\Sigma_\nu$ will typically be a lot more focused than $\Sigma_{11}$. In this example, disregarding the covariance would amount to sampling according to $\Sigma_{11}$ with much larger spread, as illustrated in (b). Using $\Sigma_\nu$ results in higher quality samples which are more likely to be valid paths, and faster PDF evaluation due to culling.

One implication of this process is that the Gaussian stored on a transport vertex is 4D (in the surface-surface case). That is, it includes information about covariance between the current vertex on the surface and the next vertex that the method is about to sample. This facilitates some parallax correction: if a path arrives at the surface some distance away from the vertex of the guide path, the 4D distribution will be conditioned on the current vertex. This shifts the mean of the remaining dimensions and overall results in a more precise distribution, thus (for example) improving the appearance of caustics (see FIG. 11). In particular, this avoids grid artifacts, which can easily arise in other guiding methods which store a directional distribution per voxel.

The guide paths are equipped with Gaussian distributions 840 at every vertex. These are usually 4D (from a point on the surface to another point on the surface). To construct them, the method needs to fit the distribution to a few samples. The method can, for example, use the neighboring guide paths for this, using a high dimensional nearest neighbor search: every vertex adds three dimensions. This can work well, but has two difficulties: first, a high dimensional neighbor search can be slow and is hard to accelerate. An image processor can usually cull based on a few things (bounding boxes of truncated Gaussians, path lengths and configurations etc.), but building acceleration structures hardly pays off for thousands of paths with hundreds of dimensions. Second, the results depend on the number of neighbors the method uses. The estimation is stable with a minimum number of neighbors (such as 10 or 20) but will change if hundreds of neighbors are used. Using too many neighbors increases the risk of evaluating neighbors which do not, any longer, belong to the unimodal lobe 840 around the guide path.

While the estimation of the distribution based on neighbors has some issues, it is clearly preferable over using analytic derivatives: neighbors are an estimate of the real data in the surroundings, including BSDF, displacement, curvature, complex shadowing, etc. This guiding technique comes with a built-in dependency on density-based outlier rejection. Similar to variance-based reweighting, this helps the method to present intermediate images to the user, and not throw away information for successive progressions. The DBOR-as-post-process approach also makes it possible to show noise free results at all stages. This comes at the cost of bias, but since the data is still around, an unbiased estimate can be constructed if needed.

Figure 11:
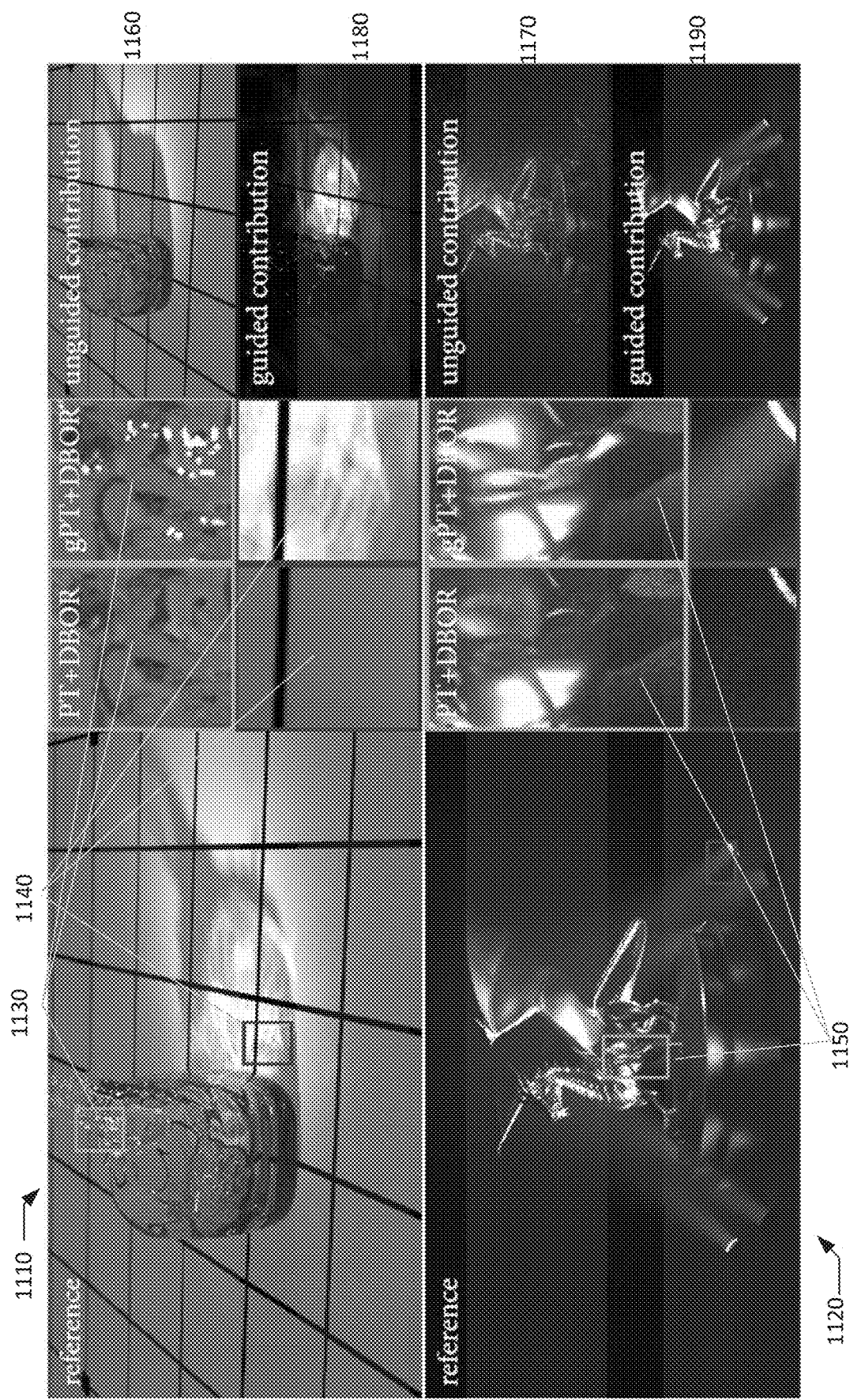
FIG. 11 shows two scenes, including detail regions, rendered using equal-time path tracing (PT) and path space guided path tracing (gPT) rendering methods, according to the present disclosure.

FIG. 11 shows two scenes 1110 and 1120, including detail regions 1130, 1140, and 1150, rendered using equal-time path tracing (PT) and path space guided path tracing (gPT) rendering methods. Both methods use DBOR for denoising. The gPT method yields two separate rendered images: an unguided contribution 1160, 1170 and a guided contribution 1180, 1190. In general, the unguided image includes general details of the scene revealed by direct and indirect lighting, whereas the guided image includes subtle lighting details such as diffuse reflection (scattering) and caustics. The insets or detail regions 1130, 1140, and 1150 show PT and guided PT (gPT) with outlier removal; it can be seen that PT misses lighting effects it cannot render efficiently (e.g., caustics). In both scenes visible in FIG. 11, guided PT robustly identifies the part of light transport that cannot be handled by PT efficiently and improves upon the image using guided sampling only for these parts. As a side effect, the method obtains a smooth/low contrast image (unguided contribution) and a separate sharp/high contrast image (guided contribution), each of which can be denoised separately and then combined.

The second aspect is that DBOR only selects paths which are hard to sample without guiding. Sampling from a fixed guide path can be very fast. Evaluating the Gaussians touches very little data and may be straightforward to do. Conversely, evaluating the PDF can require touching all of the guide paths with overlapping Gaussians, in turn possibly requiring careful implementation and efficient culling to result in fast execution.

Storing the full paths in a memory or storage device is a straightforward way of storing information about previous samples and ensuring that information is not lost. This enables a user to visualize what is going on for debugging, or to re-project guide paths for a different frame in an animation. This is also facilitated by another advantageous property of the path guiding cache: the method can hand over just a path for inclusion in the cache, without a PDF. It will be evaluated based on how likely it is to construct such a path given the sampling density that is already contained in the cache. This way, the method can even evaluate invalid samples which come from resampling the last frame, or from an adjoint transport operator (or even hand drawn samples if there is an application for that).

Another advantage of storing full paths is that this representation transparently includes all aspects of sampling: path length (Russian roulette), BSDF, distances in volumes, reflect vs. transmit choice etc. Unfortunately, exactly this full-path property also has a downside. This is especially apparent for multiple scattering: here the exact high dimensional path configuration may not play a significant role. Instead, it may only be important to exit the volume towards the light source. This is an instance of the downside of dimensionality: the method could require a number of guide paths growing exponentially with the number of dimensions. This can quickly become intractable if the sampling space cannot be broken down into small and directed problematic regions. These become essentially low-dimensional and can be approximated by full paths very well. Unfortunately, this is a big assumption to make, so in a production environment, it may not be desirable for path guiding to be switched on by default.

Figure 12:
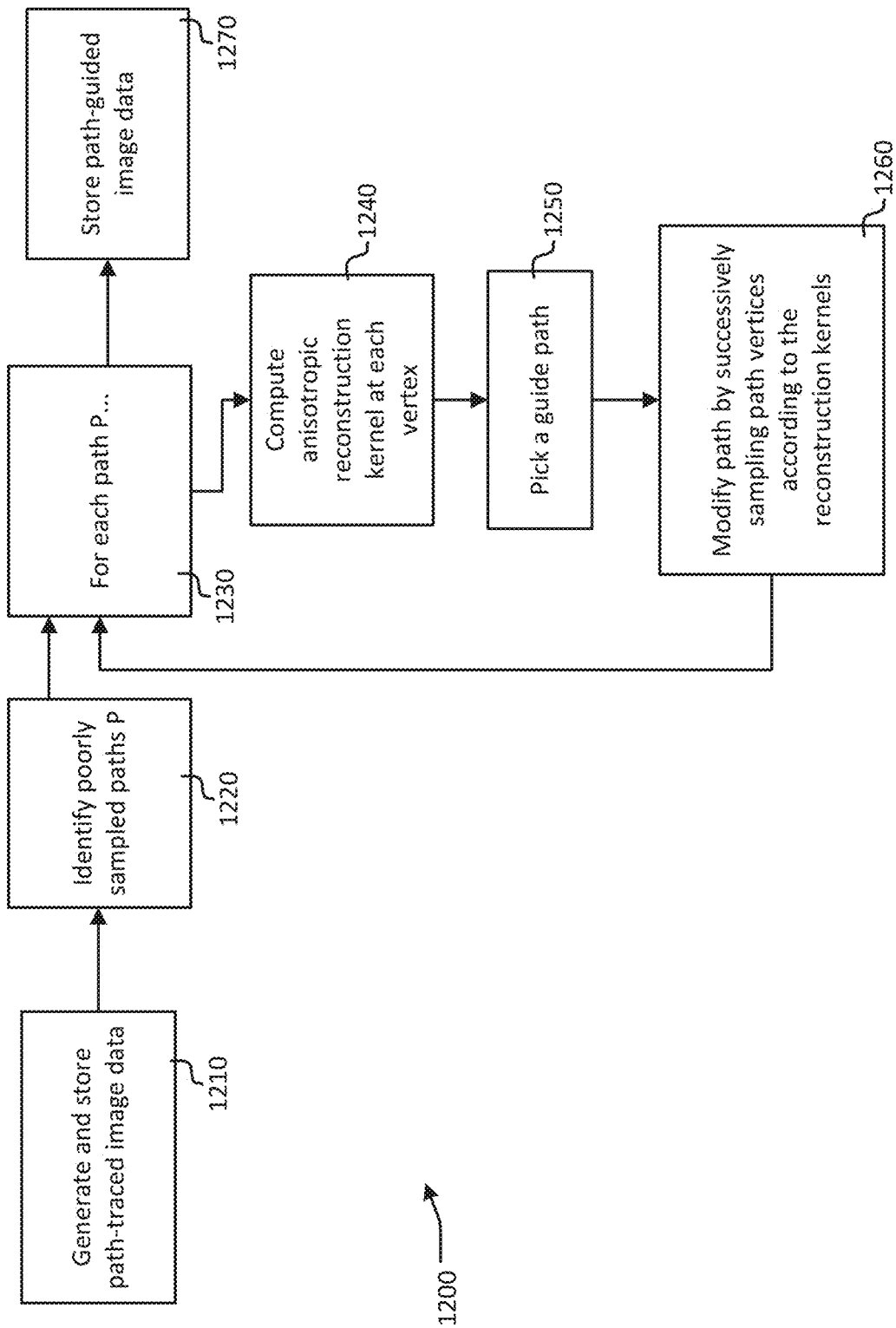
FIG. 12 shows a flow diagram of an example path guiding method according to the present disclosure.

FIG. 12 shows a flow diagram of a method 1200 as an example path guiding method according to at least one implementation. It is understood that the steps of method 1200 may be performed in a different order than shown in FIG. 12, additional steps can be provided before, during, and after the steps, and/or some of the steps described can be replaced or eliminated in other implementations. One or more of steps of the method 1200 can be carried by one or more devices and/or systems described herein, such as components of the computer system 1500 of FIG. 15, simulation system 1300 of FIG. 13, and/or rendering engine 1450 of FIG. 14.

In step 1210, the method 1200 includes generating and storing image data from an ordinary path traced rendering of the scene. The image data may include not only the rendered image itself (e.g., the unguided image, as shown for example in FIG. 11), but also other information such as the paths themselves.

In step 1220, the method identifies poorly sampled paths P, using a Monte Carlo estimator. These may for example be paths that should contribute to caustic lighting effects. The poorly sampled paths P will serve as starting guide paths for the path guiding method.

In step 1230, for each poorly sampled path or starting guide path P, the method performs steps 1240, 1250, and 1260.

In step 1240, the method computes an anisotropic reconstruction kernel (e.g., a two-dimensional Gaussian distribution or other distribution) at each vertex of the path.

In step 1250, the method picks a guide path (e.g., a set of vertices comprising the guide path) from the probability density function of guide paths by using a cumulative density function based on path weights.

In step 1260, the method modifies the guide path by successively sampling each vertex its respective Gaussian reconstruction kernel, optimizing the vertex locations until the camera importance of the path is maximized. The method may also determine, at this step, that it is desirable to split or terminate the path.

The pixel value I for a given pixel is taken from a rendered image (e.g., the "beauty image") and compared to the estimate of path's expected contribution at each path vertex. Specifically, the termination/splitting factor q is determined as ("current path weight"*"incident radiance at the current end vertex"*BSDF)/I. Optionally, path splitting (e.g., splitting one path into q different paths) may then occur when q>1. Optionally, Russian Roulette based termination may occur when q<1.

In step 1270, the method constructs and stores an image composed from the modified guide paths (e.g., the guided image, as shown for example in FIG. 11). The method is then complete for that frame (e.g., a single rendered image) of that scene.

Figure 13:
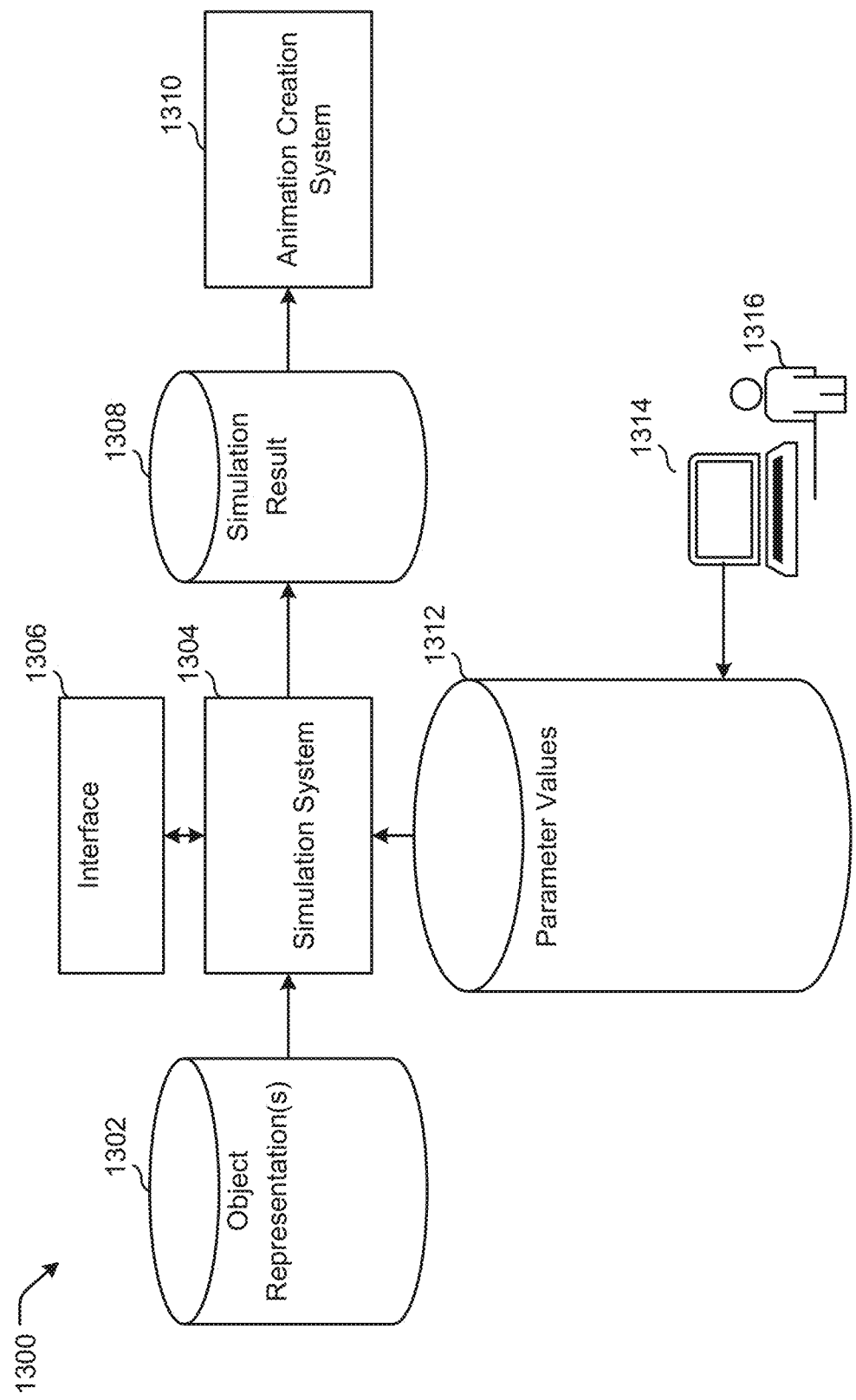
FIG. 13 is a diagram of a data flow through a simulation system.

FIG. 13 is a diagram of a data flow through a simulation system 1300 when simulation system 1300 is performing a process such as one of those described herein. An input to a simulation system 1304 is object representations 1302, interface details 1306, and parameter values 1312, perhaps obtained by artist or user 1316 input via a computer 1314. An output 1308 of a simulation might be represented in memory and provided for example to an animation creation system 1310.

The process of generating a rendering is described with reference to simulation, but it might also be the case that the shapes, colors, and textures present in a rendering may be obtained by other means. For example, an object might be represented by a point cloud obtained from a scanning device that generates point clouds from physical objects, such as a 3D laser scan, and the methods described herein could be used to render such an object.

In one implementation, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 14:
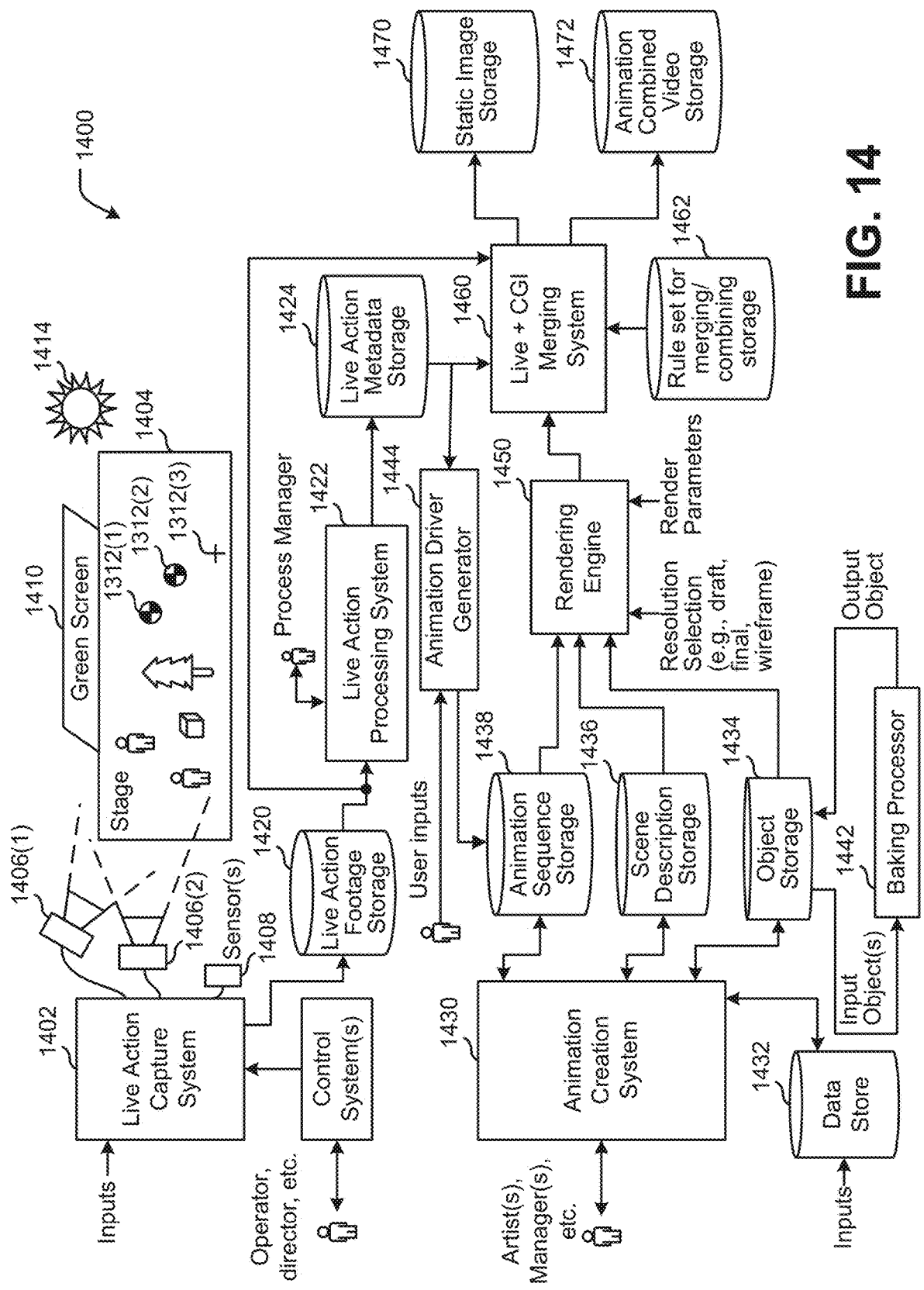
FIG. 14 illustrates an example visual content generation system as might be used to generate imagery in the form of still images and/or video sequences of images.

FIG. 14 illustrates an example visual content generation system 1400 as might be used to generate imagery in the form of still images and/or video sequences of images. Visual content generation system 1400 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 1400 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1400 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other implementations, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some implementations, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 14, a live action capture system 1402 captures a live scene that plays out on a stage 1404. Live action capture system 1402 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1406(1) and 1406(2) capture the scene, while in some systems, there might be other sensor(s) 1408 that capture information from the live scene (e.g., infrared cameras, infrared sensors, motion capture ("mo-cap") detectors, etc.). On stage 1404, there might be human actors, animal actors, inanimate objects, background objects, and possibly an object such as a green screen 1410 that is designed to be captured in a live scene recording in such a way that it is easily overlaid with computer-generated imagery. Stage 1404 might also contain objects that serve as fiducials, such as fiducials 1412(1)-(3), that might be used post-capture to determine where an object was during capture. A live action scene might be illuminated by one or more lights, such as an overhead light 1414.

During or following the capture of a live action scene, live action capture system 1402 might output live action footage to a live action footage storage 1420. A live action processing system 1422 might process live action footage to generate data about that live action footage and store that data into a live action metadata storage 1424. Live action processing system 1422 might include computer processing capabilities, image processing capabilities, one or more processors, program code storage for storing program instructions executable by the one or more processors, as well as user input devices and user output devices, not all of which are shown. Live action processing system 1422 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1414, as that might be useful in post-processing to match computer-generated lighting on objects that are computer-generated and overlaid on the live action footage. Live action processing system 1422 might operate autonomously, perhaps based on predetermined program instructions, to generate and output the live action metadata upon receiving and inputting the live action footage. The live action footage can be camera-captured data as well as data from other sensors.

An animation creation system 1430 is another part of visual content generation system 1400. Animation creation system 1430 might include computer processing capabilities, image processing capabilities, one or more processors, program code storage for storing program instructions executable by the one or more processors, as well as user input devices and user output devices, not all of which are shown. Animation creation system 1430 might be used by animation artists, managers, and others to specify details, perhaps programmatically and/or interactively, of imagery to be generated. From user input and data from a database or other data source, indicated as a data store 1432, animation creation system 1430 might generate and output data representing objects (e.g., a horse, a human, a ball, a teapot, a cloud, a light source, a texture, etc.) to an object storage 1434, generate and output data representing a scene into a scene description storage 1436, and/or generate and output data representing animation sequences to an animation sequence storage 1438.

Scene data might indicate locations of objects and other visual elements, values of their parameters, lighting, camera location, camera view plane, and other details that a rendering engine 1450 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1430 might be interactive, allowing a user to read in animation sequences, scene descriptions, object details, etc. and edit those, possibly returning them to storage to update or replace existing data. As an example, an operator might read in objects from object storage into a baking processor 1442 that would transform those objects into simpler forms and return those to object storage 1434 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 1432 might be used to drive object presentation. For example, if an artist is creating an animation of a spaceship passing over the surface of the Earth, instead of manually drawing or specifying a coastline, the artist might specify that animation creation system 1430 is to read data from data store 1432 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1444 might read in live action metadata, such as data representing movements and positions of body parts of a live actor during a live action scene. Animation driver generator 1444 might generate corresponding animation parameters to be stored in animation sequence storage 1438 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1422. Animation driver generator 1444 might convert that movement data into specifications of how joints of an articulated CGI character are to move over time.

A rendering engine 1450 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1450 might include computer processing capabilities, image processing capabilities, one or more processors, program code storage for storing program instructions executable by the one or more processors, as well as user input devices and user output devices, not all of which are shown.

Visual content generation system 1400 can also include a merging system 1460 that merges live footage with animated content. The live footage might be obtained and input by reading from live action footage storage 1420 to obtain live action footage, by reading from live action metadata storage 1424 to obtain details such as presumed segmentation in captured images segmenting objects in a live action scene from their background (perhaps aided by the fact that green screen 1410 was part of the live action scene), and by obtaining CGI imagery from rendering engine 1450.

A merging system 1460 might also read data from rulesets for merging/combining storage 1462. A very simple example of a rule in a ruleset might be "obtain a full image including a two-dimensional pixel array from live footage, obtain a full image including a two-dimensional pixel array from rendering engine 1450, and output an image where each pixel is a corresponding pixel from rendering engine 1450 when the corresponding pixel in the live footage is a specific color of green, otherwise output a pixel value from the corresponding pixel in the live footage."

Merging system 1460 might include computer processing capabilities, image processing capabilities, one or more processors, program code storage for storing program instructions executable by the one or more processors, as well as user input devices and user output devices, not all of which are shown. Merging system 1460 might operate autonomously, following programming instructions, or might have a user interface or programmatic interface over which an operator can control a merging process. In some implementations, an operator can specify parameter values to use in a merging process and/or might specify specific tweaks to be made to an output of merging system 1460, such as modifying boundaries of segmented objects, inserting blurs to smooth out imperfections, or adding other effects. Based on its inputs, merging system 1460 can output an image to be stored in a static image storage 1470 and/or a sequence of images in the form of video to be stored in an animated/combined video storage 1472.

Thus, as described, visual content generation system 1400 can be used to generate video that combines live action with computer-generated animation using various components and tools, some of which are described in more detail herein. While visual content generation system 1400 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

In one implementation, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One implementation might include a carrier medium carrying image data or other data having details generated using the methods described herein. The carrier medium can comprise any medium suitable for carrying the image data or other data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 15:
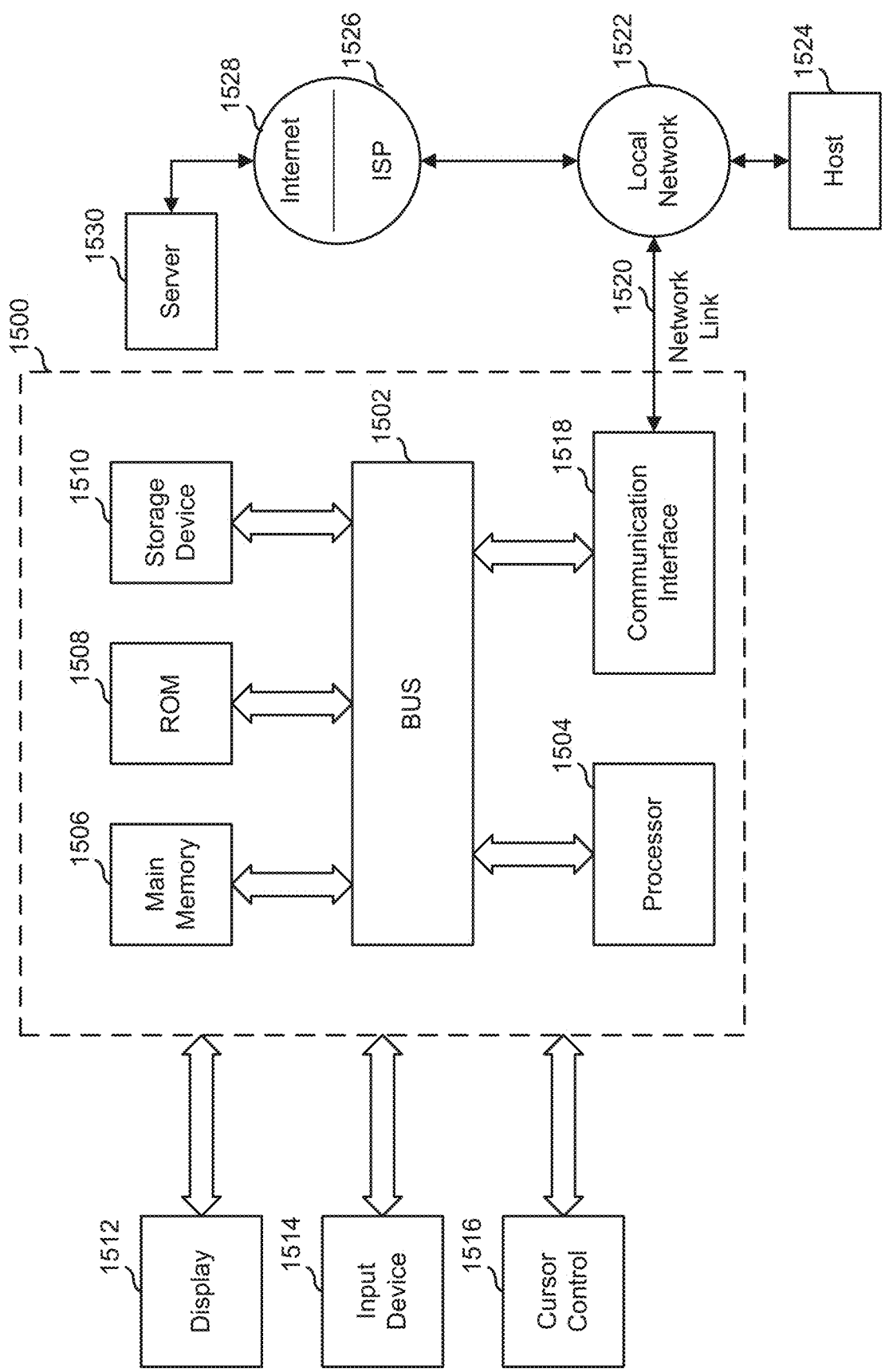
FIG. 15 is a block diagram illustrating an example computer system upon which computer systems of the systems illustrated in FIG. 1, 13, or 14 may be implemented.

FIG. 15 is a block diagram that illustrates a computer system 1500 upon which the computer systems of the systems described herein and/or visual content generation system 1400 (see FIG. 14) may be implemented. Computer system 1500 includes a bus 1502 or other communication mechanism for communicating information, and a processor 1504 coupled with bus 1502 for processing information. Processor 1504 may be, for example, a general-purpose microprocessor.

Computer system 1500 also includes a main memory 1506, such as a random-access memory (RAM) or other dynamic storage device, coupled to bus 1502 for storing information and instructions to be executed by processor 1504. Main memory 1506 may also be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a computer monitor, for displaying information to a computer user. An input device 1514, including alphanumeric and other keys, is coupled to bus 1502 for communicating information and command selections to processor 1504. Another type of user input device is a cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. In one implementation, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In other implementations, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a network connection. A modem or network interface local to computer system 1500 can receive the data. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be a network card, a modem, a cable modem, or a satellite modem to provide a data communication connection to a corresponding type of telephone line or communications line. Wireless links may also be implemented. In any such implementation, communication interface 1518 sends and receives electrical, electromagnetic, or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world-wide packet data communication network now commonly referred to as the "Internet" 1528. Local network 1522 and Internet 1528 both use electrical, electromagnetic, or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520, and communication interface 1518. In the Internet example, a server 1530 might transmit a requested code for an application program through the Internet 1528, ISP 1526, local network 1522, and communication interface 1518. The received code may be executed by processor 1504 as it is received, and/or stored in storage device 1510, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

ENUMERATION OF EXAMPLES

1. A computer-implemented method for generating a light guide path for use in rendering virtual scenes, the computer-implemented method comprising: under control of one or more computer systems configured with executable instructions, perform steps of: placing within a scene a virtual camera having a virtual camera position; generating a mask for a light source of the scene such that each position on the light source is assigned an emission probability based on a density of light paths emitted by the virtual camera exiting at that position on the light source or of light paths emitted from that position on the light source and exiting at the virtual camera position, thereby generating a masked light source data structure; generating a path-traced image by using the masked light source data structure to generate a plurality of light paths and storing a light path subset comprising the light paths of the plurality of light paths that exit at the virtual camera; using quad trees to identify a light paths subset of the plurality of light paths that are sampled less than a pre-determined threshold, for at least some light path of the light paths subset: computing a distribution for at least one vertex of a first plurality of vertices of the light path; using the distributions, sampling a position for at least one other vertex of the first plurality of vertices; constructing a guided light path from the sampled positions of the at least one vertex of the first plurality of vertices; and modifying the guided light path by iteratively sampling the positions of a second plurality of vertices along the guided light path until the guided light path is visible to the virtual camera; constructing a path-guided image using only the modified guided light paths; and combining the path-traced image with the path-guided image to form a scene image storable in computer memory.

2. The computer-implemented method of example 1, wherein the distribution of each vertex of the second plurality of vertices comprises a 2D Gaussian distribution.

3. The computer-implemented method of example 1 or example 2, wherein the distribution of each vertex of the second plurality of vertices comprises an anisotropic reconstruction kernel.

4. The computer-implemented method of any one of examples 1-3, further comprising: if a termination/splitting factor is greater than 1, splitting the guided light path into at least two guide paths.

5. The computer-implemented method of example 4, wherein splitting the guided light path comprises resampling two vertices of the second plurality of vertices for each distribution.

6. The computer-implemented method of any one of examples 1-4, further comprising: if a termination/splitting factor is less than 1, terminating the guided light path.

7. The computer-implemented method of example 6, wherein terminating the guided light path comprises deleting at least some vertices of the guided light path.

8. The computer-implemented method of any one of examples 1-7, wherein the guided light paths comprise diffuse reflection, diffuse refraction, or caustics.

9. The computer-implemented method of example 8, further comprising denoising at least one of the path traced image or the path guided image.

10. The computer-implemented method of example 9, wherein the denoising comprises density-based outlier rejection.

11. The computer-implemented method of any one of examples 1-10, wherein identifying the light paths subset of the plurality of light paths that are sampled less than a pre-determined threshold involves the use of quad trees.

12. A computer system for modeling surfaces of virtual objects, the system comprising: at least one processor; and a computer-readable medium storing instructions, which when executed by the at least one processor, causes the system to carry out the method of any one of examples 1-11.

13. A non-transitory computer-readable storage medium storing instructions, which when executed by at least one processor of a computer system, causes the computer system to carry out the method of any of embodiments 1-11.

What is claimed is:

1. A computer-implemented method for generating a light guide path for use in rendering virtual scenes, the computer-implemented method comprising:
under control of one or more computer systems configured with executable instructions, perform steps of:
a) placing within a scene a virtual camera having a virtual camera position, the virtual scene comprising a bounding box determined from a frustum of the virtual camera;
b) generating a mask for a light source of the scene such that each position on the light source is assigned an emission probability based on a cumulative density of light paths emitted from that position on the light source and exiting at the virtual camera position, thereby generating a masked light source data structure wherein light paths are emitted from the light source anisotropically, wherein the cumulative density is set to zero for positions on the light source that are incapable of emitting into the bounding box;
c) generating a path-traced image by using the masked light source data structure to generate an anisotropic plurality of light paths and storing an exiting path subset comprising the light paths of the anisotropic plurality of light paths that exit at the virtual camera;
d) using quad trees to identify a light paths subset of the exiting path subset that are sampled less than a pre-determined threshold;
e) for at least some light path of the light paths subset:
1) computing a distribution for at least one vertex of a first plurality of vertices of the light path;
2) using the distributions, sampling a position for at least one other vertex of the first plurality of vertices;
3) constructing a guided light path from the sampled positions of the at least one vertex of the first plurality of vertices; and
4) modifying the guided light path by iteratively sampling the positions of a second plurality of vertices along the guided light path until the guided light path is visible to the virtual camera;
f) constructing a path-guided image using only the modified guided light paths; and
g) combining the path-traced image with the path-guided image to form a scene image storage in computer memory.

2. The computer-implemented method of claim 1, wherein the distribution of each vertex of the second plurality of vertices comprises a 2D Gaussian distribution.

3. The computer-implemented method of claim 1, wherein the distribution of each vertex of the second plurality of vertices comprises an anisotropic reconstruction kernel.

4. The computer-implemented method of claim 1, further comprising: if a termination/splitting factor is greater than 1, splitting the guided light path into at least two guide paths.

5. The computer-implemented method of claim 4, wherein splitting the guided light path comprises resampling two vertices of the second plurality of vertices for each distribution.

6. The computer-implemented method of claim 1, further comprising: if a termination/splitting factor is less than 1, terminating the guided light path.

7. The computer-implemented method of claim 6, wherein terminating the guided light path comprises deleting at least some vertices of the guided light path.

8. The computer-implemented method of claim 1, wherein the guided light paths comprise diffuse reflection, diffuse refraction, or caustics.

9. The computer-implemented method of claim 8, further comprising denoising at least one of the path-traced image or the path guided image.

10. The computer-implemented method of claim 9, wherein the denoising comprises density-based outlier rejection.

11. A computer system for modeling surfaces of virtual objects, the system comprising:
at least one processor; and
a computer-readable medium storing instructions, which when executed by the at least one processor, causes the system to carry out the method of claim 1.

12. A non-transitory computer-readable storage medium storing instructions, which when executed by at least one processor of a computer system, causes the computer system to carry out the method of claim 1.

* * * * *

UNITED STATES PATENT AND TRADEMARK OFFICE
CERTIFICATE OF CORRECTION

| | |
|---|---|
| PATENT NO. | : 11,798,220 B2 |
| APPLICATION NO. | : 17/362555 |
| DATED | : October 24, 2023 |
| INVENTOR(S) | : Jiří Vorba |

It is certified that error appears in the above-identified patent and that said Letters Patent is hereby corrected as shown below:

In the Claims

Claim 1, Line 22, Element (g), Change "to form a scene image storage" to "to form a scene image storable".

Signed and Sealed this
Thirtieth Day of January, 2024

Katherine Kelly Vidal
*Director of the United States Patent and Trademark Office*